(12) United States Patent
Nonaka

(10) Patent No.: US 10,417,866 B2
(45) Date of Patent: Sep. 17, 2019

(54) SETTLEMENT SYSTEM

(75) Inventor: Nobuyuki Nonaka, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 969 days.

(21) Appl. No.: 13/070,058

(22) Filed: Mar. 23, 2011

(65) Prior Publication Data

US 2011/0250950 A1 Oct. 13, 2011

(30) Foreign Application Priority Data

Apr. 8, 2010 (JP) .................................. 2010-089135

(51) Int. Cl.
*G06Q 40/00* (2012.01)
*G07F 17/32* (2006.01)
(Continued)

(52) U.S. Cl.
CPC ......... *G07F 17/3244* (2013.01); *G06Q 20/10* (2013.01); *G06Q 20/18* (2013.01);
(Continued)

(58) Field of Classification Search
CPC ........ G06Q 20/40; G06Q 20/32; G06Q 20/04; G06Q 20/108; G06Q 20/20; G06Q 20/28;
(Continued)

(56) References Cited

U.S. PATENT DOCUMENTS

2002/0066042 A1\* 5/2002 Matsumoto et al. ......... 713/202
2003/0085272 A1\* 5/2003 Andrews et al. ............. 235/380
(Continued)

FOREIGN PATENT DOCUMENTS

JP 2004070833 3/2004
JP A-2007-41972 2/2007
(Continued)

OTHER PUBLICATIONS

Japanese Office Action, Japanese Pat. App. No. 2010-089135, dated Feb. 5, 2014.

*Primary Examiner* — Rajesh Khattar
(74) *Attorney, Agent, or Firm* — Simpson & Simpson, PLLC; S. Peter Konzel

(57) ABSTRACT

The present invention is provides a novel electronic settlement technique which is capable of supplying a deposit so as to continue the play of a game after a deposit available in a game facility has been consumed. A negotiable-value providing device is transmits to a user terminal device a deposit supply demand message demanding supply of a premises deposit upon receipt of a transfer demand message. A user terminal device is transmits a transfer demand message to a management server upon receipt of the deposit supply demand message. Upon receipt of the deposit supply demand message, the management server is transmits to a financial institute system a transfer request message requesting a predetermined transfer of a predetermined amount of money from a user bank account. Upon receipt of a transfer completion message, a premises server is transmits a provision instructing message instructing provision of a negotiable-value to the negotiable-value providing device. The negotiable-value providing device having received the provision instructing message executes provision of the negotiable-value.

10 Claims, 26 Drawing Sheets

(51) Int. Cl.
*G06Q 20/10* (2012.01)
*G06Q 20/18* (2012.01)
*G06Q 20/20* (2012.01)

(52) U.S. Cl.
CPC ............. *G06Q 20/20* (2013.01); *G07F 17/32* (2013.01); *G07F 17/3225* (2013.01)

(58) Field of Classification Search
CPC .......... G06Q 20/3255; G06Q 20/3274; G06Q 20/3227; G06C 6030/00; G07F 17/32; G07F 17/3223; G07F 17/3269; H04W 12/06; A63F 13/12; A63F 2300/402
See application file for complete search history.

(56) References Cited

U.S. PATENT DOCUMENTS

| | | | |
|---|---|---|---|
| 2004/0235568 A1* | 11/2004 | Kim | 463/42 |
| 2006/0240776 A1* | 10/2006 | Morita | 455/41.1 |
| 2006/0253389 A1* | 11/2006 | Hagale et al. | 705/39 |
| 2007/0011099 A1* | 1/2007 | Sheehan | 705/65 |
| 2008/0128483 A1* | 6/2008 | Asa | 235/375 |
| 2013/0018705 A1* | 1/2013 | Heath et al. | 705/13 |

FOREIGN PATENT DOCUMENTS

| | | |
|---|---|---|
| JP | 2009075986 | 4/2009 |
| WO | WO2009/150734 | 12/2009 |

\* cited by examiner

FIG.12

| USER ID | PASSWORD | E-MAIL ADDRESS |
|---------|----------|----------------|
| 111111  | jpbajdfpg | ○○@××.co.jp   |
| ⋮       | ⋮        | ⋮              |

FIG.13

| USER ID | AMOUNT OF DEPOSIT | CONSUMED AMOUNT OF MONEY |
|---|---|---|
| 111111 | ¥10,000 | ¥5,000 |
| ⋮ | ⋮ | ⋮ |

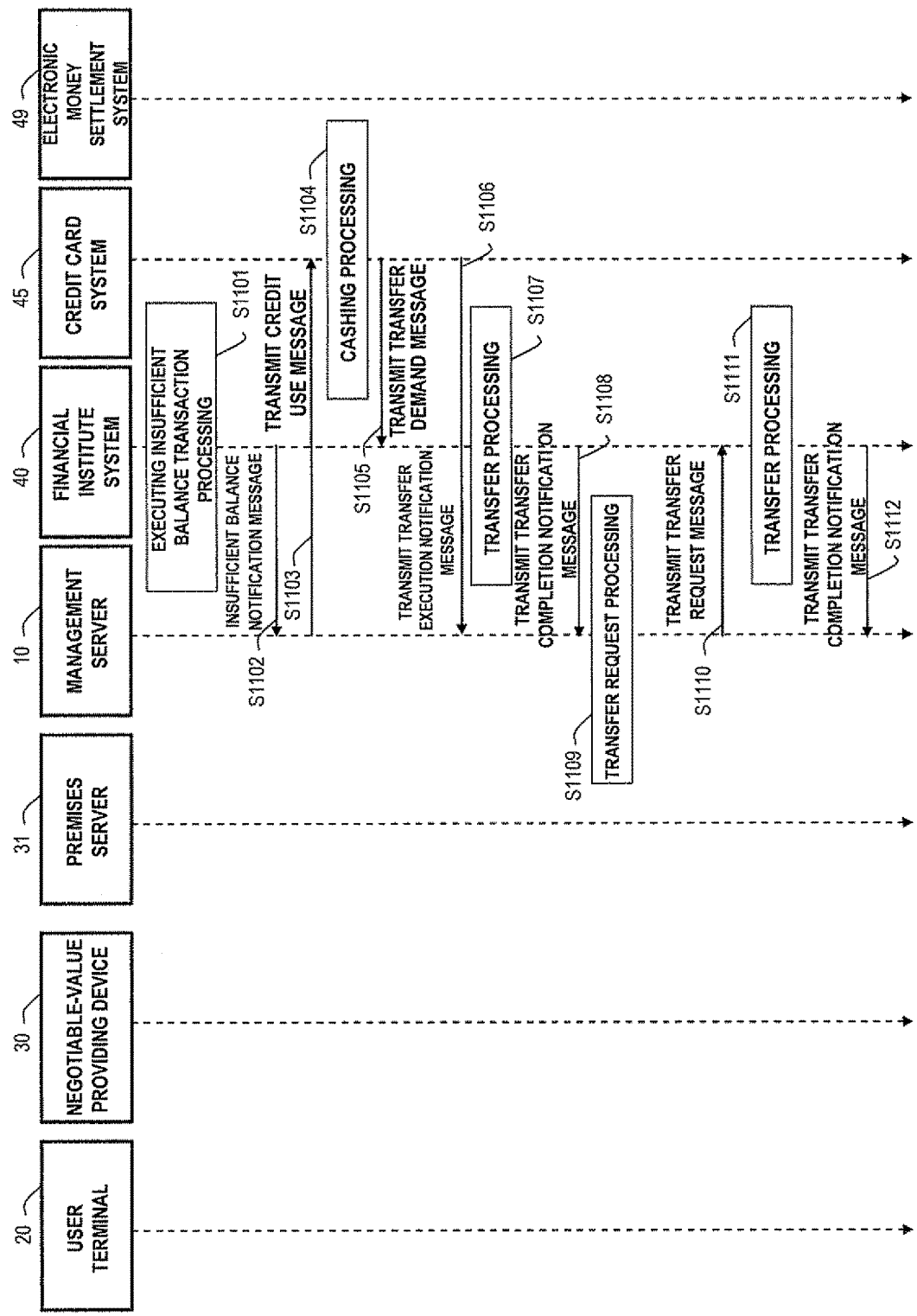

SETTLEMENT SYSTEM

CROSS-REFERENCE TO RELATED APPLICATIONS

This application is based on and claims a priority from the prior Japanese Patent Application No. 2010-089135 filed on Apr. 8, 2010, the entire contents of which are incorporated herein by reference.

BACKGROUND OF THE INVENTION

1. Field of the Invention

The present invention relates to a settlement system.

2. Description of the Related Art

With the development of information processing technology and communication technology and the prevalence of communication infrastructure in recent years, methods of payment of charges or fares have been diversified and a variety of methods in place of a cash payment have been proposed and used. In payment in game facilities such as casinos or Pachinko halls as well, if a method of payment other than a cash payment can be used, the convenience of users (players) is improved and an increase of sales in game facilities due to improvement of operability of game machines can also be expected.

As one of the methods of payment other than a cash payment, a payment using a deposit system is proposed. In the deposit system, a predetermined amount of money is deposited in advance as a purchase payment to providers or lenders of negotiable-values such as game facilities, and a purchase payment of negotiable-values or the like is made from this deposit. In addition, there is proposed a system or the like causing an apparatus (a server) which is provided with a deposit management database for managing a change in deposit, i.e., a decrease in deposit due to use or an increase in deposit due to an additional payment (Japanese Patent Application Laid-open No. 2007-41972, for example).

In the abovementioned payment using the deposit system also, if a user consumes too much money by continuously playing games, the balance of deposit is insufficient and no more games can be continued. In such a case, the user must take cumbersomeness of drawing money from a bank or the like and then depositing the drawn money to his or her account for withdrawal again.

If a user has a demand to play more games or buy something in game facility after the deposit has been consumed up in the play of a game, a settlement method which is capable of responding to such a demand is not currently provided, and game facilities have been unavoidably compelled to let such a potential demand slip.

An object of the present invention is to provide a novel electronic settlement technology which is capable of supplying a deposit immediately so as to able to continue the play of a game even after an available deposit in game facility has been consumed.

SUMMARY OF THE INVENTION

A first aspect of the present invention is proposed as a electronic settlement system.

This the electronic settlement system is characterized by comprising:

a user terminal device for transmitting a first signal (for example, a provision demand message. see step S101 of FIG. 14) including user identification information specifying at least one of a user and the user terminal device, the first signal including information for demanding provision of a negotiable-value;

a negotiable-value providing device which is capable of communicating with the user terminal device, for transmitting a second signal (for example, a provision permission demand message. see step S102 of FIG. 14) including information for demanding permission of providing a negotiable-value upon receipt of the first signal; and at least one server (for example, a premises server and a management server) for storing an amount of a deposit from the user after being associated with the user identification information and transmitting to the negotiable-value providing device a third signal (for example, a message notifying insufficient balance. see step S104 of FIG. 14) indicating that a balance of the deposit is insufficient in a case where the amount of the deposit is not sufficient for an amount of money in a negotiable-value when the second signal is received from the negotiable-value providing device, and transmitting a fifth signal (for example, a transfer request message. see step S109 of FIG. 14) including information for requesting transfer of a predetermined amount of money from an account of the user upon receipt of a fourth signal (for example, a transfer demand message. see step S107 of FIG. 14) including information for demanding transfer for supplying the deposit, wherein the negotiable-value providing device is transmitting to the user terminal device an eighth signal (for example, a deposit supply demand message. see step S105 of FIG. 14) including information for demanding supply of the deposit upon receipt of the third signal, the user terminal device is transmitting the fourth signal to the server upon receipt of the eighth signal, the server is transmitting to the negotiable-value providing device a ninth signal (for example, a provision instructing message. see step S113 of FIG. 14) including information for instructing provision of a negotiable-value upon receipt of a sixth signal (for example, a transfer completion message. see step S111 of FIG. 14) including information indicating transfer of a predetermined amount of money, and the negotiable-value providing device received the ninth signal is executing provision of a negotiable-value.

According to the electronic settlement system, it becomes possible to supply a deposit immediately so as to be able to continue the play of a game even after the available deposit in game facility has been consumed. It also becomes possible to continue the user's play of a game. In addition, the settlement system becomes capable of being compatible with a large scale network via which a number of facilities are connected.

Another aspect of the present invention is proposed as the electronic settlement system having the following features.

This the electronic settlement system is characterized by comprising:

a user terminal device for transmitting a first signal (for example, a provision demand message. see step S101 of FIG. 14) including user identification information specifying at least one of a user and the user terminal device, the first signal including information for demanding provision of a negotiable-value;

a negotiable-value providing device which is capable of communicating with the user terminal device, for transmitting a second signal (for example, a provision permission demand message. see step S102 of FIG. 14) including information for demanding permission of providing a negotiable-value, upon receipt of the first signal;

a first server (for example, a premises server) for storing an amount of a deposit from the user after being associated with the user identification information, and transmitting to the negotiable-value providing device a third signal (for example, a message notifying insufficient balance. see step S104 of FIG. 14) indicating that a balance of the deposit is insufficient in a case where the amount of the deposit is not sufficient for an amount of money in a negotiable-value when the second signal is received from the negotiable-value providing device; and a second server for transmitting a fifth signal (for example, a transfer request message. see step S109 of FIG. 14) including information for requesting transfer of a predetermined amount of money from an account of the user, upon receipt of a fourth signal (for example, a transfer demand message. see step S107 of FIG. 14) including information for demanding transfer for supplying the deposit, and transmitting to the first server a seventh signal (a payment check message. see step S112 of FIG. 14) including information indicating that transfer for supplying a deposit has been performed upon receipt of a sixth signal (for example, a transfer completion message. see step S111 of FIG. 14) including information indicating transfer of a predetermined amount of money, wherein the negotiable-value providing device is transmitting to the user terminal device an eighth signal including information for demanding supply of the deposit upon receipt of the third signal, the user terminal device is transmitting the fourth signal to the second server upon receipt of the eighth signal (for example, a deposit supply message. see step S105 of FIG. 14), the first server is transmitting to the negotiable-value providing device a ninth signal (for example, a provision instructing message. see step S113 of FIG. 14) including information for instructing provision of a negotiable-value upon receipt of the seventh signal (for example, a transfer completion message. see step S111 of FIG. 14) including information indicating transfer of a predetermined amount of money, and the negotiable-value providing device received the ninth signal is executing provision of a negotiable-value.

According to this the electronic settlement system, it becomes possible to supply a deposit immediately so as to be able to continue the play of a game even after the available deposit in game facility has been consumed. It also becomes possible to continue the user's play of a game.

The abovementioned the electronic settlement system may be further characterized in that upon receipt of the eighth signal, the user terminal device is provides a prompt for inputting a check from a user indicating an execution of transfer for supplying a deposit from the user, provides a standby display for the input, and transmits the fourth signal to a second server when the check input is provided.

According to the abovementioned the electronic settlement system, it becomes possible to supply a deposit after clarifying an intention to use transfer from a user account. It becomes further possible to continue the user's play of a game.

The abovementioned the electronic settlement system may be further characterized in that the user terminal device is transmits the fourth signal to the second server in a case where the user terminal device and the negotiable-value providing device are connected to communicate with each other again after receipt of the eighth signal.

According to the abovementioned the electronic settlement system, it becomes possible to supply a deposit after clarifying an intention of using a transfer from a user account speedily without any cumbersomeness associated with the user input. It becomes further possible to continue the user's play of a game.

Furthermore, the abovementioned the electronic settlement system may be further characterized in that:

the second server is transmits to the user terminal device an eleventh signal (for example, a payment instruction demand message. see step S501 of FIG. 18) including information for demanding a payment to a user account by utilizing another financial institute, upon receipt of a tenth signal (for example, a payment instruction demand message. see step S411 of FIG. 17) including information indicating that a balance in the user account is insufficient after a second server has transmitted the fifth signal;

the user terminal device is transmits to the second server a twelfth signal (for example, a credit use message. see step S503 of FIG. 18) including information for instructing a payment to the user account by utilizing the another financial institute after receiving the eleventh signal;

the second server is transmits a thirteenth signal (for example, a credit demand message. see step S505 of FIG. 18) including information for demanding transfer of a predetermined amount of money to the user account by utilizing the another financial institute upon receipt of the twelfth signal, and transmits to the first server a fifteenth signal (for example, a payment check message. see step S605 of FIG. 19) including information for confirming a payment for the deposit upon receipt of a fourteenth signal (for example, a transfer completion message. see step S604 of FIG. 19) including information indicating that a predetermined amount of money has been transferred to the user account by utilizing another financial institute;

the first server is transmits to the negotiable-value providing device a sixteenth signal (for example, a provision instructing message. see step S606 of FIG. 19) including information for instructing provision of a negotiable-value upon receipt of the fifteenth signal; and the negotiable-value providing device is executes provision of the negotiable-value upon receipt of the sixteenth signal.

According to the abovementioned the electronic settlement system, even if a balance of a user account is insufficient, it becomes possible to supply a deposit so as to be able to continue the play of a game even after the available deposit in game facility has been consumed. It becomes further possible to continue the user's play of a game.

Still furthermore, the abovementioned the electronic settlement system may be further characterized as follows.

That is, the abovementioned the electronic settlement system is characterized in that: the user terminal device further has an electronic money processing means (for example, an electronic money processing portion) for making a payment of money of a negotiable-value electrically stored, the negotiable-value being associated with at least one of the user and the user terminal device; and the second server is transmits a seventeenth signal (for example, a transfer request message. see step S1002 of FIG. 25) including information for requesting supply of a balance of electronic money by transfer from the user account in a case where the balance of the electronic money is insufficient for a payment of money for providing a negotiable-value, and transmits an eighteenth signal (for example, a credit utilizing message. see step S1103 of FIG. 26) including information for demanding transfer a predetermined amount of money to the user account by utilizing the another financial, and in the case where the balance in the user account is insufficient, and transmits a twenty first signal (for example, a charge instructing message. see step S1005 of FIG. 25) including information for instructing supply of a balance of electronic money to the user terminal device upon receipt of a nineteenth signal (for example, a transfer completion message. see step S1004 of FIG. 25) including information indicating a transfer from the user account or a twentieth signal (for example, a transfer completion notification message. see step S1108 of FIG. 26) including information indicating transfer of a predetermined amount of money to the user account by utilizing the another financial institute.

According to the abovementioned the electronic settlement system, settlement based on a deposit and electronic money is made possible and even if a balance of electronic money is insufficient, a balance of electronic money is supplied from the user account or the like. Thus, it becomes possible to supply electronic money so as to be able to continue the play of a game even after a deposit has been consumed. It becomes further possible to continue the user's play of a game.

The electronic settlement system according to another aspect of the present invention is characterized by comprising a device for storing an amount of deposit from a user after being associated with a user identification information, and providing a negotiable-value corresponding to the stored amount of the deposit in response to an input signal demanding provision of the negotiable-value from the user in order to enable play of a game of a game machine, determining whether or not the amount of the stored deposit is sufficient for an amount of money for a negotiable-value demanded by the user, when an input signal demanding provision of a negotiable-value is received from the user;

transmitting information requesting transfer of a predetermined amount of money for supplying the deposit to the external financial institute system in which the user account is registered, as a result of the determination, in a case where it is determined that the amount of the stored deposit is not sufficient for the amount of money for the negotiable-value demanded by the user;

supplying the transferred predetermined amount of money to the stored deposit, when a transfer completion signal of the predetermined amount of money has been received from the external financial institute system; and executing provision of the negotiable-value demanded from the user in order to enable continuation of the user's play of the game, based on the supplied deposit.

According to the present invention, there can be provided a novel electronic settlement technique which is capable of supplying a deposit immediately so as to be able to continue the play of a game even after an available deposit in game facility has been consumed. In addition, this technique can be made compatible with a large scale network via which a number of facilities are connected.

BRIEF DESCRIPTION OF THE DRAWINGS

FIG. 12 is a view showing a data structure example of a user table;

FIG. 13 is a view showing a data structure example of a user deposit table;

FIG. 26 is a sequential diagram showing an operation example in a case in which the balance in a bank account of a user is insufficient.

DESCRIPTION OF THE PREFERRED EMBODIMENTS

Hereinafter, the preferred embodiments of the present invention will be described with reference to the drawings.

First Embodiment

[1. Configuration Example of Settlement System According to First Embodiment]

Figure 1:
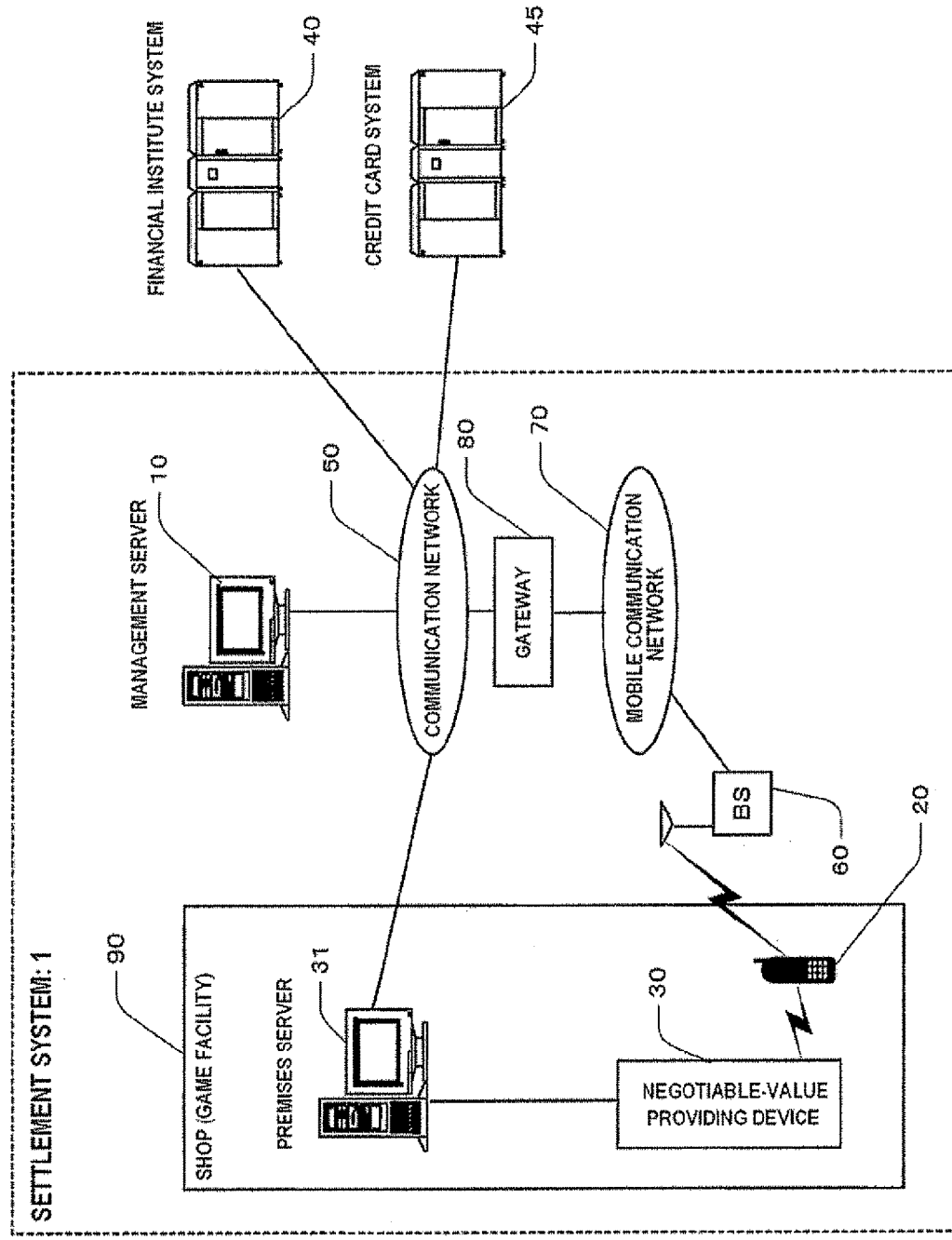
FIG. 1 is a network diagram showing an example of a settlement system according to a first embodiment.

FIG. 1 is a network diagram showing an example of a settlement system according to a first embodiment.

In the example shown in the figure, a settlement system 1 as the electronic settlement system has a management server 10, a user terminal device 20, a negotiable-value providing device 20, and a premises server 31. In addition, the settlement system 1 is connected to be able to communicate with a financial institute system 40 and/or a credit card system 45.

The management server 10 is connected to the user terminal device 20, a premises server 31, the financial institute system 40, and the credit card system 45 via a communication network 50.

The management server 10 is connected to the communication network 50 to be able to communicate with the premises server 31 via the communication network 50. The user terminal device 20 can communicate with the management server 10, the premises server 31, and/or the financial institute system 40 via a base station (BS) 60, a mobile communication network 70, and a gateway 80 connecting the mobile communication network and the communication network 50 to each other. This user terminal device 20 can also communicate with a negotiable-value providing device 30 by a short distance communication means (for example, a noncontact type IC card and a reader/writer therefor) included in the user terminal device 20.

The financial institute system 40 is a system which is capable of electronically providing an access to an account that follows. The financial institute system 40 that the settlement system 1 uses, directly or indirectly operates and/or manages an account (hereinafter, referred to as a user bank account) of a person (hereinafter, referred to as a user) who plays a game at a game machine and makes a payment by using this electronic settlement system and/or the settlement system 1. The financial institute system 40 has: an account of a person (hereinafter, referred to as a settlement business operator) who directly or indirectly operates and/or manages the settlement system 1 and receives a consideration, a payment, a fee of operation of the settlement system 1; and an account of a person (hereinafter, referred to as a game facility business operator) who provides a negotiable-value to a user and receives a payment from the user by using this settlement system 1. These user bank account, settlement business operator's account, and game facility business operator's account may be provided in the financial institute system 40 or may be provided in another financial institute system 40. While FIG. 1 shows that these accounts are provided in the same financial institute system 40, it should be noted that an aspect of the present embodiment is not limited to such an aspect.

The credit card system 45 is a system of electrically performing a variety of settlements and payments utilizing a credit card ("another financial institute" of the present invention). For example, in a Suica system (The "Suica" is a registered trademark of East Japan Railway Co., Ltd.) which is a traffic-related electronic money system, there exists a "Suica automatic charge service" in which if electronic money is equal to or smaller than a preset amount of money, a preregistered amount of money is automatically paid as electronic money by utilizing a credit card settlement. In addition, as a method operated by a user oneself, in the case of Suica which is the electronic money, a specified amount of money can be paid as electronic money by means of credit settlement from a dedicated menu of a cellular phone. While the exemplary embodiment described here is directed to a payment utilizing credit card settlement relative to electronic money, there has never existed a method of automatic or "one-touch"-based payment utilizing credit card settlement relative to a bank account. While, in the present specification, the above payment system is defined as a "credit card system" for the sake of clarity, as a matter of course the system is not limited to a system according to such a credit card system as long as it is capable of lending money for the sake of supply of electronic money.

Hereinafter, constituent elements of the abovementioned settlement system 1 will be described.

[1.1. Negotiable-Value Providing Device]

A negotiable-value providing device 30 is a device for providing to a user any negotiable-value (referred to as a tangible object or an intangible object which can be purchased by exchanging money) as a consideration obtained by a user performing electronic settlement using a user terminal device 20. The negotiable-value providing device 30 is a ball lending machine, medal lending device, a CAT terminal device, a player tracking system device or a PTS terminal or the like in game facility, for example. The player tracking system is a system enabling a storage medium such as an IC card to be used for transfer or money exchange of a negotiable-value between gaming machines (for example, slot machines) in game facility such as casino. In general, in the player tracking system, an IC card is stocked in a player tracking system device; a negotiable-value to be provided to a player according to a game result is stored in the IC card; in a case where the player terminates a game, for example, the IC card is returned from a card slot to the player; and the IC card returned to the player can be used after transferred to another gaming machine. The negotiable-value providing device 30 in the present embodiment does not need to be a device for directly providing a negotiable-value such as a ball lending machine or a medal lending machine. The device 30 includes a device for indirectly providing a negotiable-value to a user, for example, by notifying to a game facility (shop) side that electronic settlement is possible and then causing the game facility side to deliver articles, like a debit card settlement terminal or a credit card CAT terminal, for example.

Figure 2:
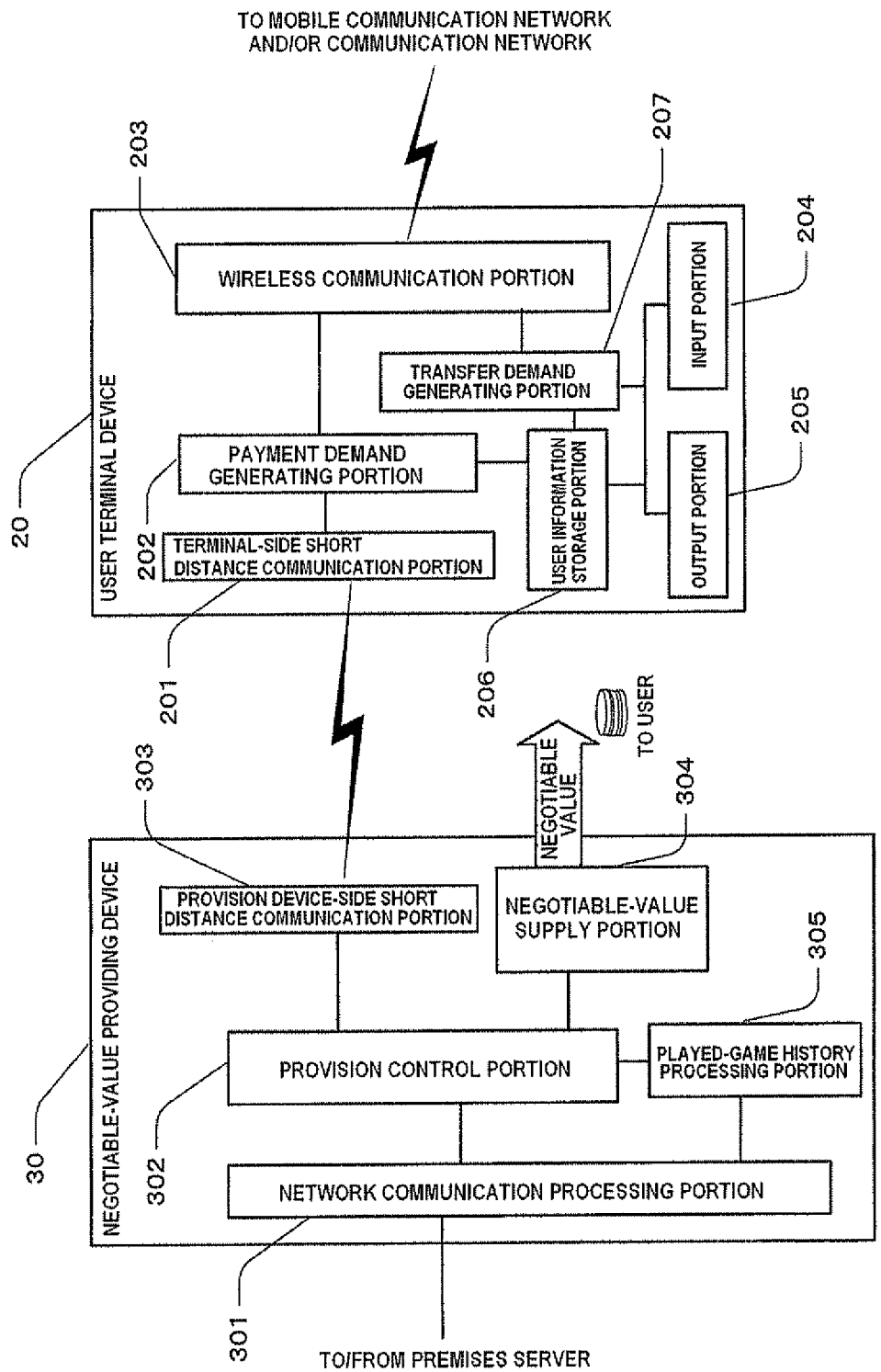
FIG. 2 is a functional block diagram depicting a configuration example of a negotiable-value providing device and a user terminal device.

FIG. 2 is a functional block diagram depicting a configuration example of the negotiable-value providing device 30 and the user terminal device 20. Hereinafter, a configuration of the negotiable-value providing device 30 will be described with reference to FIG. 2.

The negotiable-value providing device 30 has a network communication processing portion 301, a provision control portion 302, a providing device-side short distance communication portion 303, a negotiable-value supply portion 304, and a played-game history processing portion 305.

The network communication processing portion 301 has a function of executing communication with a premises server 31 and is a communication board having a protocol stack mounted thereon, for example. The negotiable-value providing device 30 may be connected in plurality to the premises server 31, and the negotiable-value providing device 30 and the premises server 31 are connected to each other via a communication network such as a LAN or other communication means.

The provision control portion 302 has a function of instructing and/or controlling operation of the network communication processing portion 301, the providing device-side short distance communication portion 303, and/or the negotiable-value supply portion 304. This control portion is a microcomputer having programs for implementing the negotiable-value providing device 30 mounted thereon, for example.

The providing device-side short distance communication portion 303 has a function of making communication with a terminal-side short distance communication portion 201 which is incorporated in the user terminal device 20. This communication portion is a noncontact type IC card reader/writer, for example. A communication system that the providing device-side short distance communication portion 303 uses does not need to be limited to wireless communication and may be infrared-ray communication. In addition, the communication system is not always a noncontact type communication system, and the present invention is applicable even if a system of making connection and communication by means of a communication cable or a USB socket is employed.

The negotiable-value supply portion 304 has a function of providing a negotiable-value to a user in accordance with an instruction from the providing control portion 302. The negotiable-value supply portion is a lending ball output portion of a ball lending machine, a medal hopper of a medal lending machine, a display of an authentication terminal (for example, a CAT terminal), or a printer or the like. Any negotiable-value is available as long as it can be purchased by money. The negotiable-value is a lending ball, a lending medal, a casino chip (medal), a prepaid card, an on-value card (house card), points written in a storage medium or equivalent or intangible service or the like. The negotiable-value supply portion 304 is not always limited to the one directly providing a negotiable-value to a user and may be the one indirectly providing a negotiable-value to a user. For example, the negotiable-value supply portion 304 is a liquid crystal display device. The liquid crystal display device displaying a message of instructing a clerk or staff in game facility or the like to deliver commodities is an aspect of providing a negotiable-value according to the present invention.

The played-game history processing portion 305 has a function of generating played-game history data which is data relating to a player's played-game history and then transmitting the generated data to the premises server 31 or the management server 10 via the network communication processing portion 301, based on use of the negotiable-value providing device 30 by a user.

For example, assume that the negotiable-value providing device 30 is a lending machine (ball lending machine) additionally provided at a specific game machine. In order for a player to play a game at a game machine at which this lending machine is additionally provided, the player receives ball bending by way of settlement using the settlement system 1 by means of the negotiable-value providing device 30 which is a lending machine and a user owned cellular phone which is the user terminal device 20. The played-game history processing portion 305 generates played-game history data which is data relating to which player has played games at which game machine or what amount of money has been used to play games in accordance with an operational state of the provision control portion 302 and an operational state of the game machines and then transmits the generated data to a server managing the played-game history data. The played-game history data is sent to the server and is stored therein every time all the negotiable-value providing devices 30 are used. The played-game history data is parsed or analyzed by means of a data mining technique or the like, thereby clarifying a player's action tendency, a popularity tendency of gaming machines, or a tendency of use by time intervals, and as a result, useful information can be acquired as a document for shop management or game machine development or the like.

While the present embodiment describes a configuration of using the management server 10 as a server for managing played-game history data, as a matter of course the server for managing played game history data may be incorporated in the settlement system 1, as a server device other than the management server 10.

[1.2. User Terminal Device]

Next, a user terminal device 20 will be described with reference to FIG. 2. The user terminal device 20 is a terminal device that can communicate with a management server 10 via a communication network 50 and that can also communicate with a negotiable-value providing device 30 by using a short distance communication means. The user terminal device 20 may communicate with a premises server 31 via the communication network 50.

The user terminal device 20 is, for example, a cellular phone having a function of a noncontact-type IC card (for example, FeliCa. The "FeliCa" is a registered trademark of Sony Corporation); a PDA (Personal Data Assistant) mounting a short distance communication means and a wireless communication means; a handheld game machine; an IP telephone mounting a wireless LAN; or a dedicated terminal device of this settlement system 1. The user terminal device 20 has: a terminal-side short distance communication portion 201 for making communication with a providing device-side short distance communication portion 303 described previously; a payment demand generating portion 202; a wireless communication portion 203; an input portion 204; an output portion 205; a user information storage portion 206; and a transfer demand generating portion 207.

The terminal-side short distance communication portion 201 has a function of making communication with the providing device-side short distance communication portion 303 and is a chip and an antenna for noncontact-type OC card, for example.

The payment demand generating portion 202 has a function of generating a payment demand message demanding the premises server 31 for payment and/or settlement of a consideration (charge) of a negotiable-value received by a user so as to cause the negotiable-value providing device 30 to provide a negotiable-value. This generating portion is a microcomputer mounting i-appli (The "i-appli" is a registered trademark of NTT DOCOMO INC.), for example.

The wireless communication portion 203 has a function for the user terminal device 20 to connect to a mobile communication network 70 and execute communication via the mobile communication network 70. This communication portion is a wireless communication circuit having a modulation circuit and/or a demodulation circuit, for example. The mobile communication network may be a general cellular phone communication network or may be a WIMAX or wireless LAM communication network.

The input portion 204 has a function of converting a user instruction to an electrical signal and posting the converted signal to the payment demand generating portion 202 and/or the transfer demand generating portion 207 or the like. This input portion is a set of keys of a cellular phone, a touch pen and a touch panel, or a pointing device, for example.

The output portion 205 has an information output function for the user terminal device 20 to convey information to a user. This output portion is a liquid crystal panel of a cellular phone, a voice output device (such as a speaker), or a small-sized printer or the like.

Figure 3:
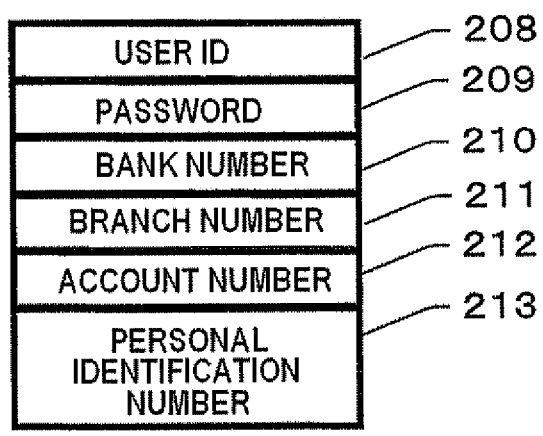
FIG. 3 is a view showing an example of information that is stored in a user information storage portion.

The user information storage portion 206 has a function of storing information required for user payment or settlement. FIG. 3 shows an example of information that is stored in the user information storage portion 206. In this example, the user information storage portion 206 stores: a user ID 208 which is information for uniquely specifying a user registered as a user of the user terminal device 20; a password 209 for the management server 10 and/or the premises server 31 to authenticate a user; a bank number 210, a branch number 211, and an account number 212 which are items of information for specifying a user account 41 corresponding to a user bank account, in order for a user to draw a payment; and a personal identification number 213 set for the user account. These items of information, in particular, the bank number 210, the branch number 211, the account number 212, and the personal identification number 213 may be inputted by a user at the time of installation of applications for a user to cause the user terminal device 20 to function as the payment demand generating portion 202 and the transfer demand generating portion 207 or at the time of user registration for receiving service. For example, an application started up in the user terminal device 20 demands a user to input these items of information from the input portion 204, and the inputted items of information 208 to 213 are stored in the user information storage portion 206. These items of information 208 to 213 are used when a transfer demand message making a transfer demand of a deposit from the user account 41 to a settlement business operator's account 42 and are transmitted to the management server 10 as a part of the transfer demand message. Therefore, a user does not need to carry a credit card or a bit card at bank. Further, the user inputs in advance personal information or account information, or alternatively, a personal identification number or the like required at the time of settlement in his or her owned user terminal device 20 only. Accordingly, there is a very low possibility of information leakage, enabling the user to use the device at ease.

The user ID 208 may be an identification number automatically assigned by the management server 10 or may be identification information included in the user terminal device 20, for example, a FeliCa ID (The "FeliCa" is a registered trademark of Sony Corporation), a solid identification number (including FOMA card identification information (The "FOMA" is a registered trademark of NTT DOCOMO INC.)).

[1.3. Management Server]

A description of constituent elements of the settlement system 1 will be continued turning to FIG. 1.

The settlement system 1 has a management server 10 as a constituent element which is a nucleus of the system. The management server 10 is a device comprising: a central processing unit (CPU); a main memory (RAM); a read-only memory (ROM); an input/output device (I/O); and an external storage device such as a hard disk device if necessary. This system is an information processing device such as a computer or a workstation, for example. The ROM or the hard disk device or the like stores a program for causing the information processing device to function as the management server 10 or a program for causing a computer to execute an electronic settlement method. These programs are mounted on a main memory and the CPU executes them, whereby the management server 10 is implemented or the electronic settlement method is executed. In addition, the abovementioned programs may not be always stored in a storage device included in the information processing device or may be a constituent element provided from an external device (for example, ASP (such as server of Application Service Provider)), the constituent element being mounted on the main memory. Further, this management server 10 may be comprised of a standalone device or may be configured by connecting a plurality of devices via a network. The management server 10 may be a centered configuration in which all functions are centralized at one site or may be a distributed server configuration which is divided on a function by function basis to thereby enable distributed processing.

Figure 4:
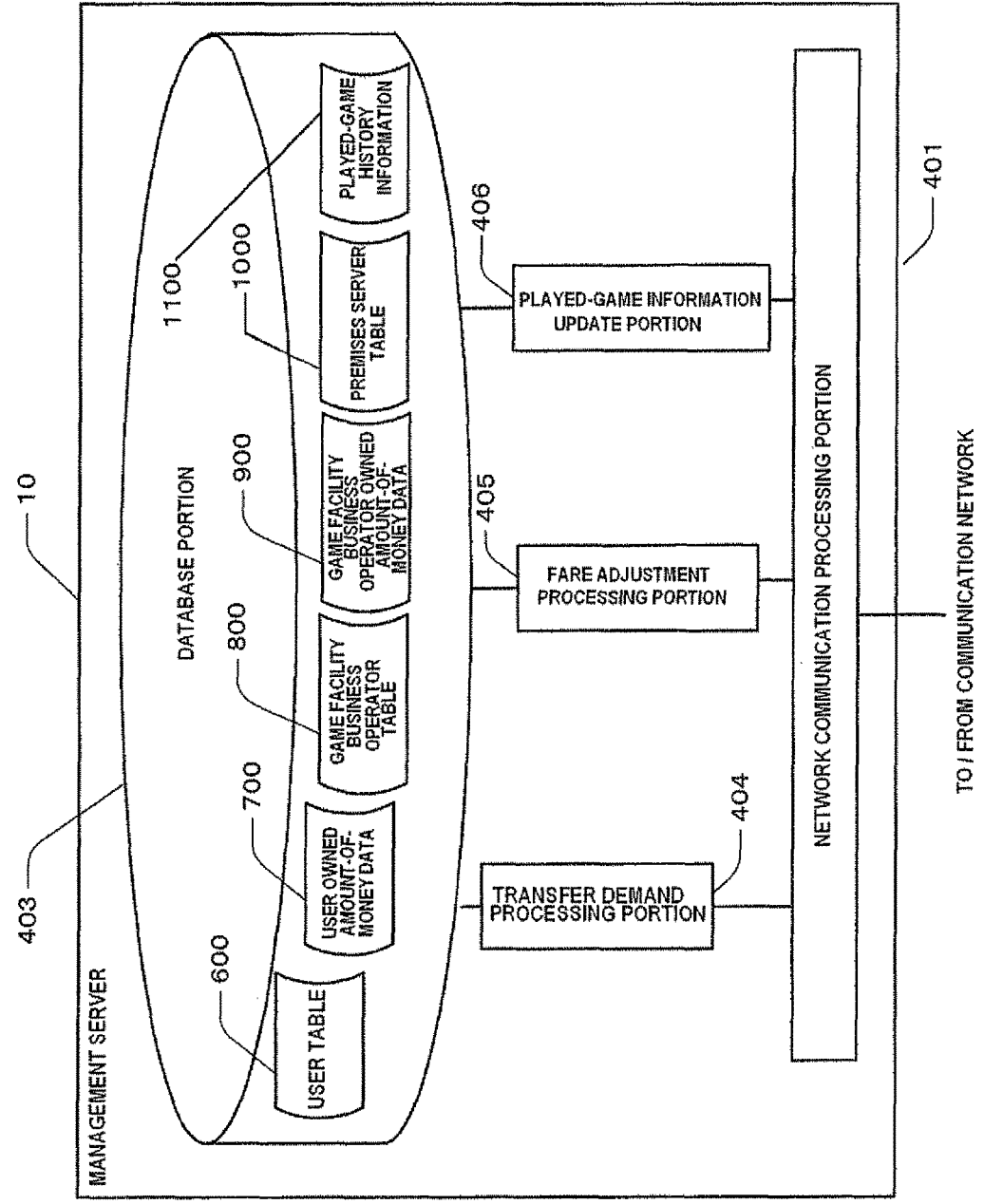
FIG. 4 is a functional block diagram depicting a configuration example of a management server.

Hereinafter, the management server 10 will be described with reference to FIG. 4. FIG. 4 is a functional block diagram depicting a configuration example of the management server 10. The management server 10 shown in FIG. 4 has: a network communication processing portion 401; a payment demand processing portion 402; a database portion 403; a transfer demand processing portion 404; a fare adjustment processing portion 405; and a played-game information update portion 406. These portions are constituent elements implemented by means of a storage device storing programs and a CPU or the like executing these programs, respectively.

The network communication processing portion 401 has a function of executing communication with the user terminal device 20, the premises server 31, the financial institute system 40, and the credit card system 45 via the communication network 50. This network communication processing portion is a communication board for executing a protocol stack, for example.

The database portion 403 stores: amount-of-money data 700 owned by each user registered in the settlement system 1; and amount-of-money data 900 owned by a game facility business operator, and stores: a user table 600 that is being necessary information for executing transfer between the financial institute system 40 and the database portion 403; the user owned amount-of-money data 700; a game facility business operator table 800; the game facility business operator-owned amount-of money data 900; and a premises server table 1000; and played-game history information 1100.

Figure 5:
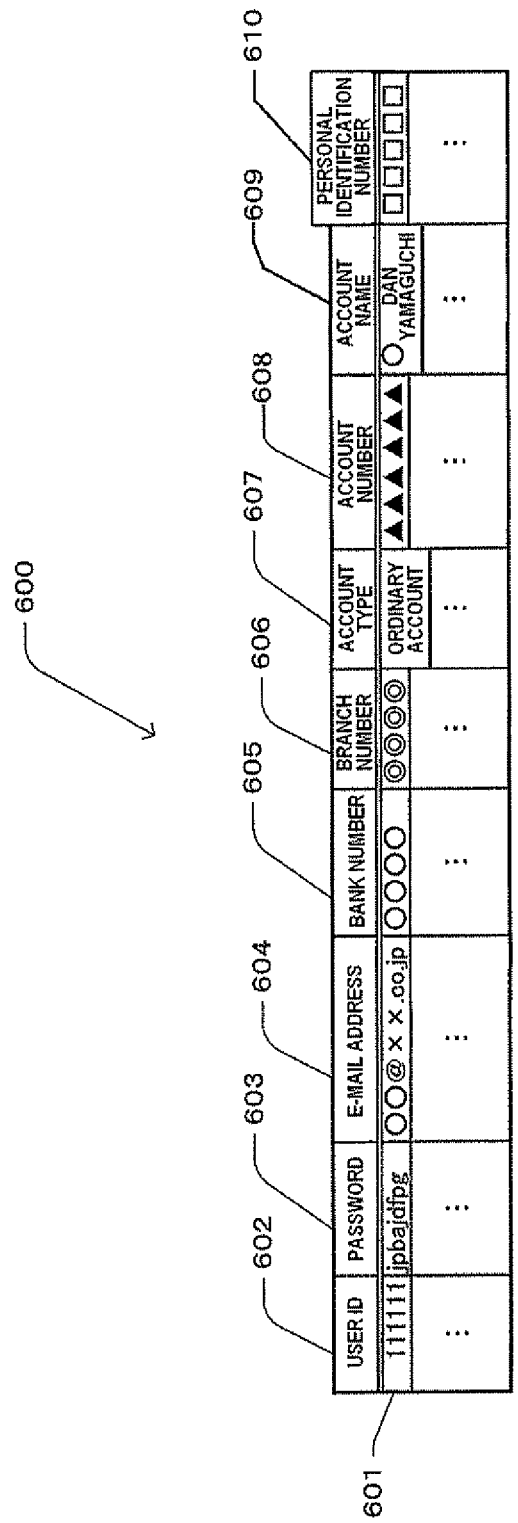
FIG. 5 is a view showing a configuration example of a user table that is stored in the database portion.

FIG. 5 shows a configuration example of the user table 600 that is stored in the database portion 403. The user table 600 is data having one record 601 for each user. Each record 601 stores a user ID 602, a password 603, an E-mail address 604, and a bank number 605, a branch number 606, an account type 607, an account number 608, an account person's name 609, and a personal identification number 610 for specifying a user account or an account of a withdrawal destination. The user ID 602 is information for uniquely specifying a user. The password 603 is information for preventing a third person from spoofing a user of that password and illegally using the settlement system 1. The E-mail address 604 is information used as a destination address which is a destination of an electronic mail when a result notifying portion 407 notifies a processing result of payment processing to a user. The bank number 605, the branch number 606, the account type 607, the account number 608, the account person's name 609, and the personal identification number 610 are items of information for specifying a withdrawal destination account for the financial institute system 40 and using the account.

The information stored in the user table 600 is inputted to the management server 10 at the time of user registration in the management server 10.

Figure 6:
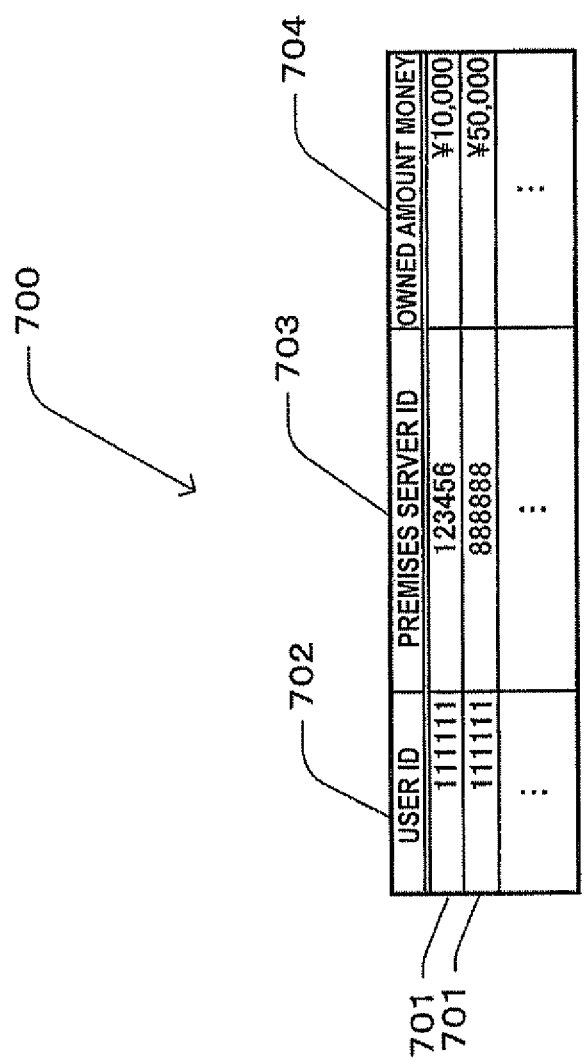
FIG. 6 is a view showing a configuration example of user owned amount-of-money data stored in the database portion.

FIG. 6 shows a configuration example of the user owned amount-of-money data 700 that is stored in the database portion 403. The user owned amount-of-money data 700 is data having one record 701 for each user. Each record 701 has: a user ID field 702 for storing a user ID; a premises server ID field 703 for storing a premises server ID which is information for uniquely specifying an infra-facility server 31; and an user owned amount-of-money field 704 for storing a user owned amount of money which is an amount of money deposited by the user in the infra-facility server 31 specified by a premises server ID. A value stored in the user owned amount-of-money field 704 is rewritten so as to increase by an amount of deposit when a user deposits money in the infra-facility server 31 of the settlement system 1 or so as to decrease by an amount of payment when a payment is made utilizing the negotiable-value providing device 30. Even a same user manages his or her amount of money for each premises server 31 so that a plurality of records 701 can be carried for the same user.

Figure 7:
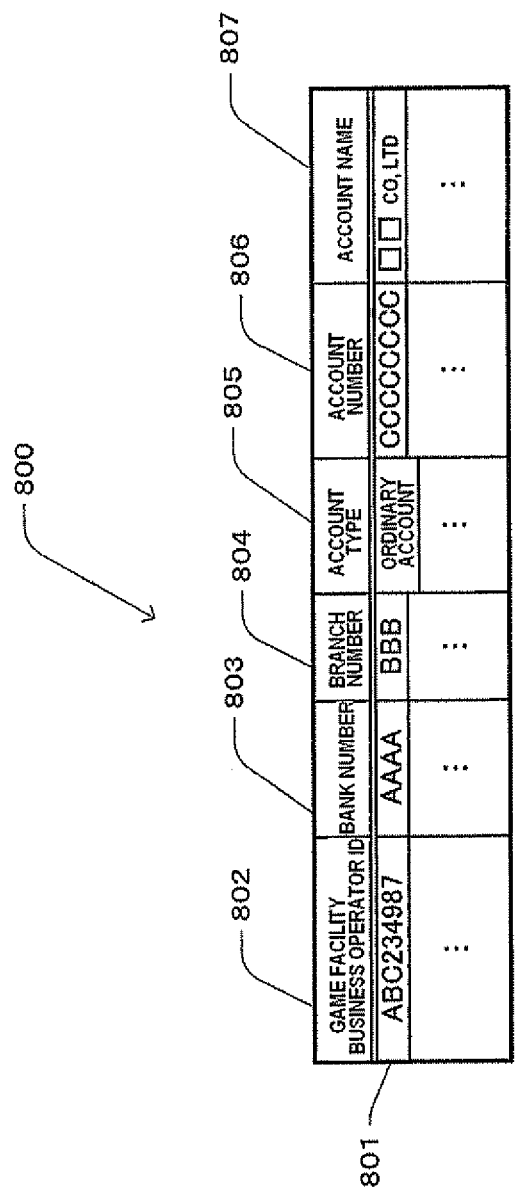
FIG. 7 is a view showing a configuration example of a game facility business operator table that is stored in the database portion.

FIG. 7 shows a configuration example of the game facility business operator table 800 that is stored in the database portion 403. The game facility business operator table 800 is data storing information relating to a game facility business operator. The game facility business operator table 800 is data having one record 801 for each game facility business operator which is subscribed in the settlement system 1. Each record 801 stores: a game facility business operator ID 802 for storing a game facility business operator ID; and a bank number 803, a branch number 804, an account type 805, an account number 806, and an account person's name 807 for specifying an account of the game facility business operation, the account being a transfer destination account for transferring an amount of money paid from a user to a negotiable-value providing device 30. The game facility business operator ID 802 is information for uniquely specifying a game facility business operator. The bank number 805, the branch number 806, the account type 807, the account number 808, and the account person's name 809 are items of information for specifying a transfer destination account for the financial institute system 40.

The information stored in the game facility business operator table 800 is inputted to the management server 10 when a game facility business operator is subscribed and registered in the settlement system 1.

Figure 8:
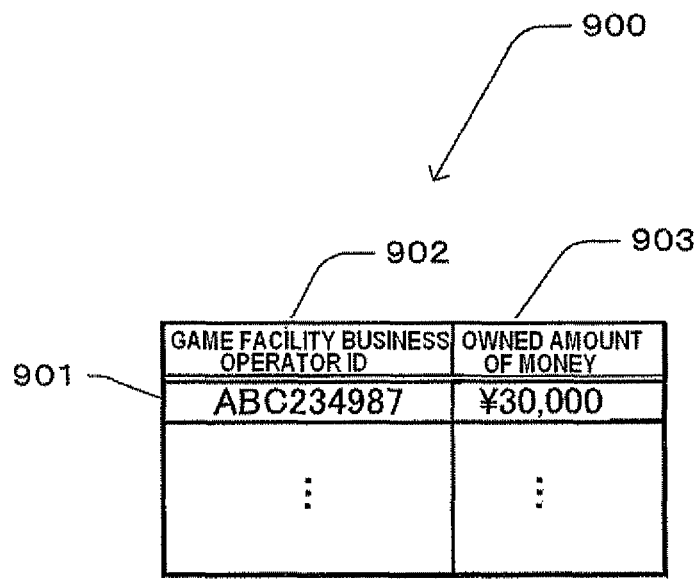
FIG. 8 is a view showing a configuration example of gaming facility business operator-owned amount-of-money data that is stored in the database portion.

FIG. 8 shows a configuration example of the game facility business operator owned amount-of-money data 900 that is stored in the database portion 403. The game facility business operator owned amount-of-money data 900 is data having one record 901 for each game facility business operator registered in the settlement system 1. Each record 901 has a game facility business operator ID 902 and a business operator owned amount-of-money 903 for storing an owned amount of money which is an amount of money for the settlement system 1 to transfer to a game facility business operator account. A value stored in the business operator owned amount-of-money 903 is rewritten so as to increase by payment from a user by utilizing the negotiable-value providing device 30 via the premises server 31 or so as to decrease by an amount of transfer to a game facility business operator account utilizing the financial institute system 40.

Figure 9:
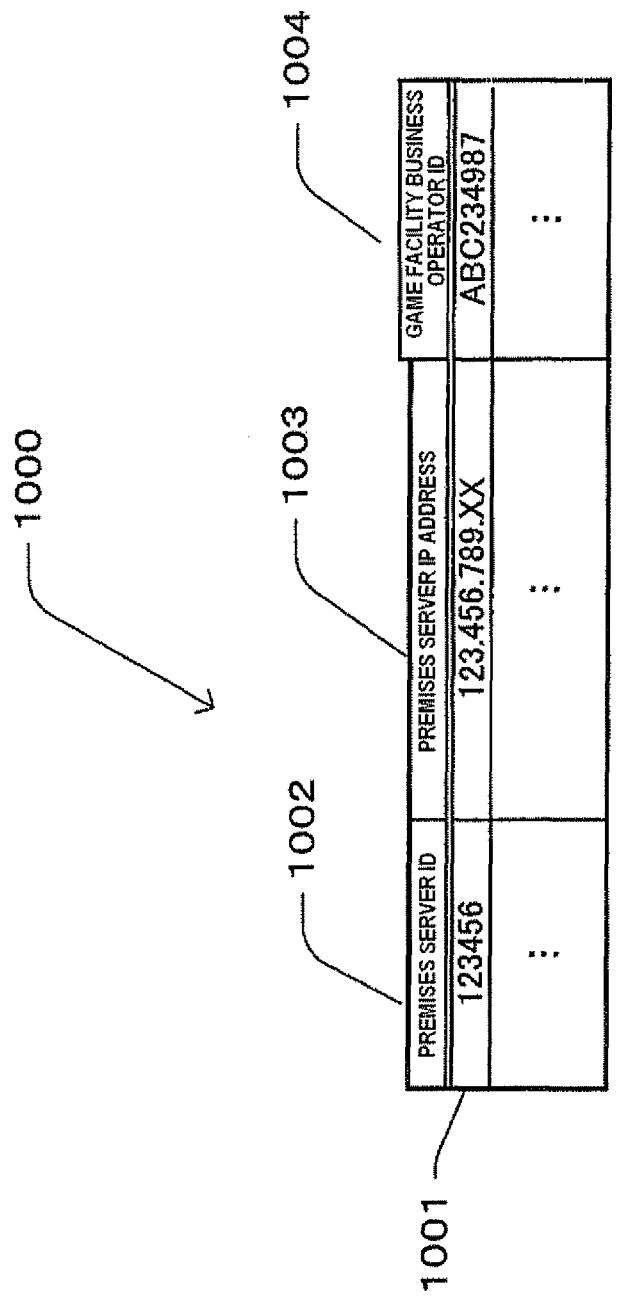
FIG. 9 is a view showing a configuration example of a premises server table that is stored in the database portion.

FIG. 9 shows a configuration example of the premises server table 1000 stored in the database portion 403. The premises server table 1000 is data having one record 1001 for each premises server 31 included in the settlement system 1. Each record 1001 stores a premises server ID 1002, a premises server IP address 1003, and a game facility business operator ID 1004.

The premises server ID 1002 is information for uniquely specifying the premises server 31. The premises server IP address is destination information for the management server 10 to make communication with the premises server 31, for example, information utilized as a transmission destination address for use in transmission of a deposit notification message notifying a deposit from a user to one premises server 31. The game facility business operator ID 1004 is information for specifying a game facility business operator having a right of receiving payment corresponding to a user-consumed amount of money about the premises server 31 to which the premises server ID 1002 is assigned, and an ID which is the same as the game facility business operator ID 802 (see FIG. 7) of the game facility business operator table 800 is used.

The played-game history information 1100 is information indicating a history relating to a played game such as when, where, and at which game machine, and how much a player has played a game. This information is generated by means of the played-game history processing portion 305 of each negotiable-value providing device 30 and is generated by accumulating and storing the played-game history data that is transmitted via the premises server 31. This played-game history information 1100 is analyzed by means of a known marketing analysis or data mining technique, whereby a variety of useful information can be obtained.

A description of the configuration example of the management server 10 will be continued turning to FIG. 4.

First, the transfer demand processing portion 404 will be described. The transfer demand processing portion 404 has a function of processing a transfer demand message received from the user terminal device 20. The transfer demand processing portion 404 receives a transfer demand message or the like from the user terminal device 20 or the premises server 31 via the network communication processing portion 401. The contents of the transfer demand message are the contents of demanding a specified amount of money to be withdrawn from a user bank account so as to thereby able to use the withdrawn amount of money in the settlement system 1, in more detail, the specified premises server 31. The transfer demand processing portion 404 having received this transfer demand message or the like checks the user table 600 that is stored in the database portion 403. The transfer demand processing portion 404 acquires the bank number 605, the branch number 606, the account type 607, the account number 608, the account person's name 609, and the personal identification number 610 which are items of information for specifying a user account as a transfer source account from the user table 600. Together with these items of information, this transfer demand processing portion transmits information for specifying the settlement business operator account 43 which is a transfer destination account, as a transfer request message, to the financial institute system 40 via the network communication processing portion 401. The financial institute system 40 transfers a specified amount of money from a user bank account to a settlement business operator account upon receipt of the transfer request message. The transferred amount of money becomes a fund (excluding a transaction fee) which a user can use by utilizing this settlement system 1.

Next, the fare adjustment processing portion 405 will be described. The fare adjustment processing portion 405 receives a message indicating an amount of money consumed by a user from each infra-facility server 31 and then changes or updates the game facility business operator owned amount-of-money data 900, in more detail, the business operator owned amount-of-money 903, in response to this message. In addition, the fare adjustment processing portion 405 demands the financial institute system 40 to transfer an amount of money indicated by the game facility business operator owned amount-of-money data 900 from a settlement business operator account to a game facility business operator account of each of the game facility business operators. The amount of fund to be transferred corresponds to an amount of payment to a game facility business operator, which the settlement system 1 has deposited from a user, i.e., the business operator owned amount-of-money 903 of the game facility business operator owned amount-of-money data 900. In the present embodiment, the fare adjustment processing portion 405 autonomously performs transfer request processing. For example, the fare adjustment processing portion 405 automatically starts up with a predetermined timing (for example, 0'clock every midnight weekend). The fare adjustment processing portion 405 having started up inquires each premises server 31 as to an amount of money consumed by a user, i.e., an amount of payment to a game facility business operator and then each premises server 31 updates the business operator owned amount-of-money 903 of the game facility business operator owned amount-of-money data 900 in response to a payment demand message transmitted in response to this inquiry. Further, the fare adjustment processing portion 405 checks all of the game facility business operator owned amount-of-money data 900 that is stored in the database portion 403 and transmits a transfer request so as to perform a transfer from a settlement business operator account in the financial institute system 40 to a corresponding game facility business operator account if the transfer is not completed.

The game facility information update portion 406 has a function of accumulating and storing from time to time the played-game history data received via the infra-facility server 31 from the history information processing portion 305 of the negotiable-value providing device 30 and then updating the played-game history information 1100.

[1.3.1. Distributed Server Configuration of Management Server]

While the example shown in FIG. 4 showed that the management server 10 is implemented by one server device, as a matter of course the management server 10 is not limited to such one server device-employed configuration.

Figure 10:
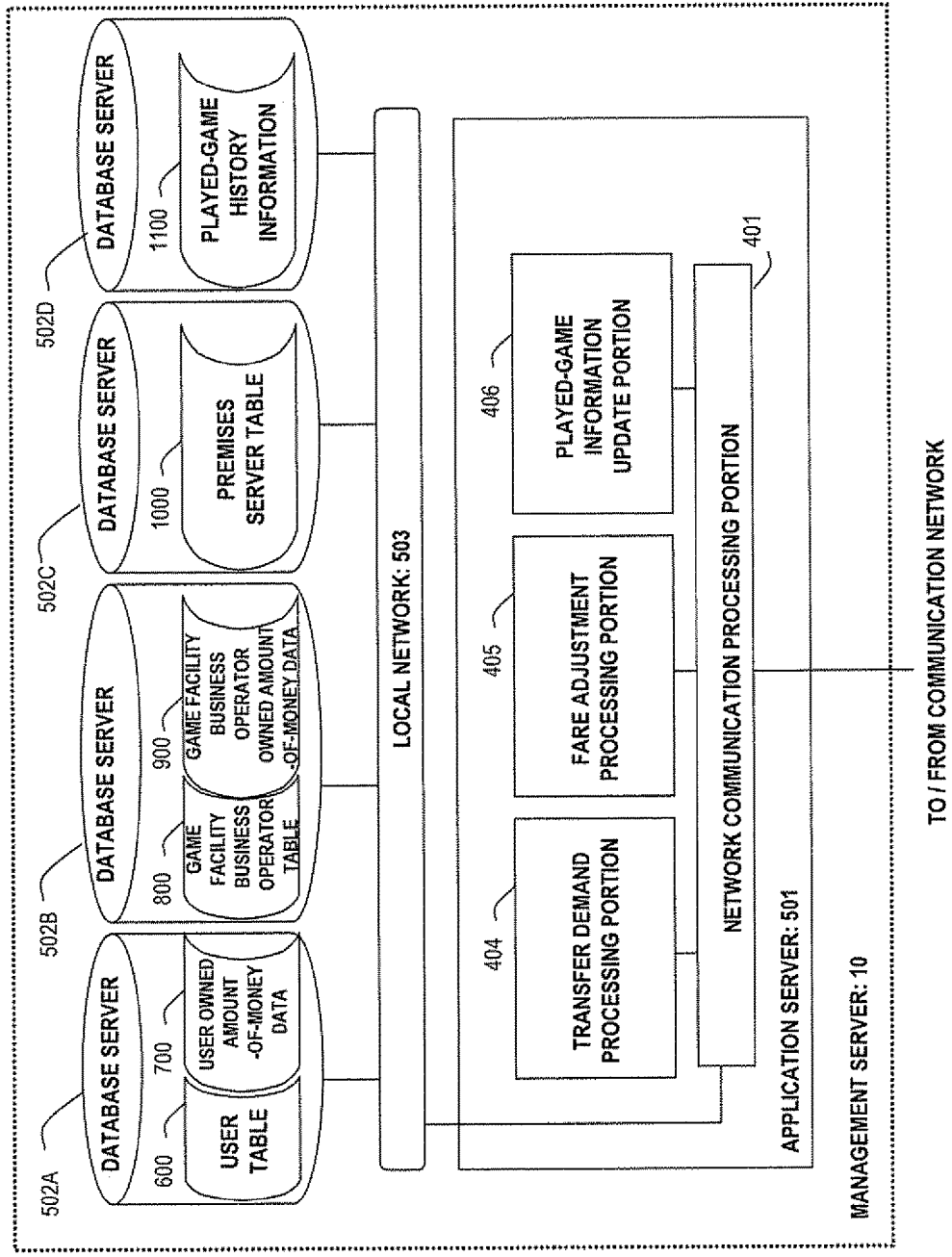
FIG. 10 is a functional block diagram depicting a configuration example in a case where the management server is employed as a distributed server configuration.

FIG. 10 is a functional block diagram depicting a configuration example in a case where the management server 10 is configured as a distributed server. Same constituent elements as those shown in FIG. 4 are designated by same reference numerals and a detailed description is omitted.

The management server 10 is employed as a distributed server configuration, thereby making it possible to lower a possibility that information relating to a user or a game facility business operator leaks or is stolen and to improve reliability relative to the safety of the settlement system 1.

The management server 10 employed as a distributed server configuration is comprised of an application server 501 and one or a plurality of database servers 502A to 502D. The application server 501 has a network communication processing portion 401, a transfer demand processing portion 404, a fare adjustment processing portion 405, and a played-game information update portion 406.

In the example shown in FIG. 10, four database servers 502A, 502B, 502C, 502D are connected to be able to communicate with the application server 501 via a local network 503. The four database servers 502A to 502D are constituent elements corresponding to the database portion 403 shown in FIG. 4. In this configuration example, the first database server 502A stores a user table 600 and/or user owned amount-of-money data 700; the second database server 502B stores a game facility business operator table 800 and/or game facility business operator owned amount-of-money data 900; the third database server 502C stores a premises server table 1000; and the fourth database server 502D stores played-game history information 1100. The application server 501 demands these database servers 502A to 502D for required information upon a demand for processing and the database servers 502A to 502D acquire required information from the stored contents and posts the acquired information to the application server 501.

It is possible to arbitrarily define how the database portion 403 is divided, how many database servers 502 are provided, and how the stored contents (table, data) of a respective one of the database servers are assigned, without being limited to the configuration shown in FIG. 10. At this time, a plurality of database servers 502A to 502D are installed and managed in physically different places without being installed in a same plate, whereby these servers become stronger against information leakage.

[1.4. Premises Server]

A description of the configuration example of the settlement system 1 will be continued. First, the premises server 31 will be described.

As shown in FIG. 1, the settlement system 1 has the premises server 31. The premises server 31 is a device comprising external storage devices such as a central processing unit (CPU), a main memory (RAM), a read-only memory (ROM), an input/output device (I/O), and a hard disk device if necessary. This server is an information processing device such as a computer or a workstation, for example. The ROM or the hard disk device or the like stores a program for causing the information processing device to function as the premises server 31 or a program for causing a computer to execute an electronic settlement method. These programs are mounted on a main memory and the CPU executes them, whereby the premises server 31 is implemented or the electronic settlement method is executed. In addition, the abovementioned programs may not be always stored in a storage device in the information processing device or may be a constituent element provided from an external device (for example, ASP (such as server of Application Service Provider)), the constituent element being mounted on the main memory. Further, this premises server 31 may be comprised of a standalone device or may be a device group configured by connecting a plurality of devices via a network.

When the premises server 31 receives from the management server 10 a user deposit processing demand message which is a message indicating that a user deposit has been received (that transfer between accounts has been performed), the server stores an amount of the deposit described in that message as an amount of money which a user can consume.

In a case where a user attempts to consume a negotiable-value from the negotiable-value providing device 30 that is managed by the infra-facility server 31, the negotiable-value providing device 30 inquires the infra-facility server 31 as to whether or not a consideration of a negotiable-value can be withdrawn from the user deposit. In a case where the consideration of the negotiable-value can be withdrawn from the user deposit, i.e., in a case where a deposit sufficient for payment of the consideration remains, the premises server 31 transmits a message (referred to as a provision instructing message) to the negotiable-value providing device 30 so as to pay out the negotiable-value.

Figure 11:
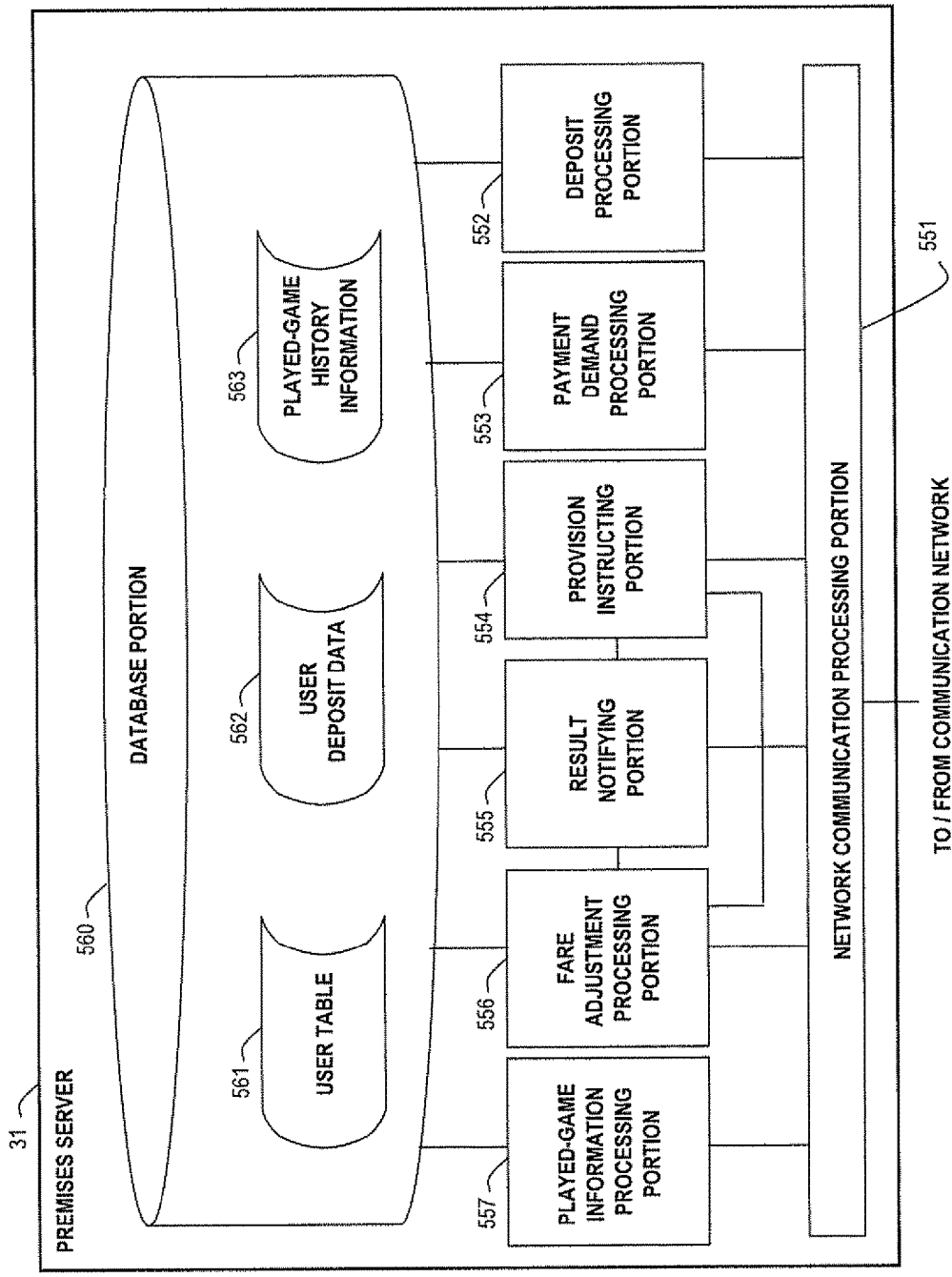
FIG. 11 is a functional block diagram depicting a configuration example of a premises server.

Hereinafter, the premises server 31 will be described with reference to FIG. 11. FIG. 11 is a functional block diagram depicting a configuration example of the premises server 31.

The premises server 31 shown in FIG. 11 has a network communication processing portion 551, a deposit processing portion 552, a payment demand processing portion 553, a provision instructing portion 554, a result notification portion 555, a fare adjustment processing portion 556, a played-game information processing portion 557, and a database portion 560. These portions are constituent elements comprised of a storage device storing a program and a CPU or the like executing the program.

The network communication processing portion 551 has a function of executing communication with the management server 10 and/or the user terminal device 20 or the like. This portion is a communication board or the like mounting a protocol stack, for example.

The deposit processing portion 552 has a function of, upon receipt of a user deposit processing demand message from the management server 10, generating or updating user deposit data 562 in response to this message.

The payment demand processing portion 553 has a function of processing a provision demand message received from the user terminal device 20. The payment demand processing portion 553 receives the provision demand message from the user terminal device 20 via the network communication processing portion 551. The payment demand processing portion 553 then checks user deposit data 562 of the user stored in the database portion 560 to be described later. In a case where there is a deposit more than a payment demand in comparison with the user deposit data 562 and the provision demand message, the payment demand processing portion 553 starts up the provision instruction portion 554. The provision instructing portion 554 has started up generates a provision instructing message and transmits the generated provision instructing message via the network communication processing portion 551 to the negotiable-value providing device 30 specified by the provision demand message.

In a case where a payment according to the payment demand message described previously is possible, the payment demand processing portion 553 updates (rewrites) user deposit data 562 of the user stored in the database portion 556 in accordance with a charge for a negotiable-value.

The provision instructing portion 554 generates a provision instructing message for the sake of transmission to the negotiable-value providing device 30 and transmits the provision instructing message via the network communication processing portion 401 to the negotiable-value providing device 30 specified by the provision demand message.

The result notifying portion 555 has a function of notifying to the user terminal device 20 whether or not a provision demand message has been appropriately processed. As an example, the result notifying portion 555 generates an electronic mail of which destination is the user terminal device 20 and then transmits the generated electronic mail. Alternatively, the result notifying portion 555 may wait for browsing from the user terminal device 20 by describing information indicating a processing result on a web page which user terminal device 20 can browse. The contents of the notification from the result notifying portion 555 are a message "PAYMENT DEMAND HAS BEEN PROCESSED. THANK YOU FOR YOUR USE." or "YOUR BALANCE OF DEPOSIT IS INSUFFICIENT. NO PAYMENT HAS BEEN MADE SUCCESSFULLY" or the like, for example. In addition, in a case where a user has transmitted a message inquiring a remaining amount of deposit from the user terminal device 20 (including a case where transmission is made via the negotiable-value providing device 30), the result notifying portion 555 may have a function of referring to user deposit data 562 of the user in response to this inquiry message, computing how much the remaining amount of deposit that can be consumed at a current time point is, and then, causing the user terminal device 20 or the negotiable-value providing device 30 to output a result of the computation.

The fare adjustment processing portion 556 has a function of notifying a user-consumed amount of money in a deposit to the management server 10, referring to the user deposit data 562. The consumed amount of money by an individual user does not always need to be notified to the management server 10, and it is sufficient if a total amount of money consumed by all users stored in the premises server 31 can be computed for the user-consumed amount of money.

The played-game information processing portion 557 has a function of: receiving from each negotiable-value providing device 30 played-game history information which is information indicating a history relating to the play of a game, such as when, where, at which game machine, and how much a player has played a game; causing the database portion 560 to store the received information; and transmitting the game machine history information stored in the database portion 560 to the management server 10. It is possible to arbitrarily define with what timing the played-game information processing portion 557 transmits the above information to the management server 10. For example, it is possible to define every week at the time of completion of sales or the like.

Next, the database portion 560 will be described. The database portion 560 stores a user table 561, user deposit data 562, and played-game history information 563.

The user table 561 is data storing information relating to a user (player). FIG. 12 shows a data structure example of the user table 561. The user table 561 shown in this example is data having one record 561A for each user utilizing the infra-facility server 31. Each record 561A has: a user ID field 561B for storing a user ID which is information for uniquely specifying a user; a password field 561C for storing a password; and an E-mail address field 561D for storing an E-mail address.

The user deposit table 562 is data having one record for each user utilizing the premises server 31. FIG. 13 shows a data structure example of the user deposit table 562. The record 562A that is included in the user deposit table 562 has: a user ID field 562B for storing a user ID; an amount-of-deposit field 562C for storing an amount of deposit which is an amount of money deposited by a settlement business operator from a user about the premises server 31; and a consumed amount-of-money field 562D for storing an amount of money consumed by using the negotiable-value providing device 30 managed by the premises server 31. The user deposit corresponds to a "user's premises deposit" to be described later.

The played-game history information 563 is played-game history data or a set of such items of data which is data relating to a played-game history by a player, the data being transmitted from the negotiable-value providing device 30 that is connected to the premises server 31.

[1.5. Management Server and Premises Server]

The management server 10 and the premises server 31 may not be provided separately, and the present embodiment is applicable if these servers are configured to function as both of the management server 10 and the premises server 31 by means of one information processing device.

[1.6. Communication Network]

A description of constituent elements of the settlement system 1 according to the present embodiment will be restarted turning to FIG. 1.

The communication network 50 functions to enable transmission or receiving of information between devices when a device connected to the network irrespective of whether it is based on a wired/wireless system, a leased line, or a switched line has established a session relative to a target device. The communication network 50 may be implemented by combining a plurality of networks with each other via a gateway like the Internet. In addition, any communication network may be available as long as information can be transmitted or received between devices when a session is established. In other words, devices may be temporarily connected by means of PPP connection in place of being directly connected to a trunk line referred to as a so called backbone. The abovementioned "communication network" includes a communication network which does not use a route switching means such as a switching unit, a switch or a router such that a leased line is fixedly provided.

[1.7. Mobile Communication Network, Gateway, and Base Station]

The configuration example of the settlement system 1 shown in FIG. 1 assumes a case in which a cellular phone is used as the user terminal device 20. Therefore, it is shown that the cellular phone that is the user terminal device 20 is wirelessly connected to a base station 60 and from the base station 60, the cellular phone is connected to the communication network 50 to which the management server 10 is connected, via the mobile communication network 70 and the gateway 80. However, if the user terminal device 20 can be directly connected to the communication network 50, the user terminal device 20 may be connected to the management server 10 without a need to make communication via the mobile communication network 10 or the gateway 80. For example, if the user terminal device 20 has a wireless LAN connection function, there is no need to make communication via the mobile communication network 70 and the gateway 80. For example, the present invention is applicable even if the user terminal device 20 is a constituent element to be connected to the communication network 50 by providing an access to a hot spot (wireless LAN terminal) connected to the communication network 50.

[1.8. Financial Institute System]

The financial institute system 40 is a system having a function of transferring a specified amount of money from a user bank account to a settlement business operator's account and vice versa in accordance with a transfer demand from the management server 10. While the example shown in FIG. 1 showed that that the management server 10 and the financial institute system 40 are connected to each other via the communication network 50, the present embodiment is applicable even if the management server 10 and the financial institute system 40 are adapted to be connected to each other via a leased line (not shown). For example, in a case where the financial institute system 40 is a so called Internet bank-provided system, the management server 10 and the financial institute system 40 would be adapted to be connected to each other via the communication network 50.

[2. Operation Example of the Settlement System According to the First Embodiment]

Figure 14:
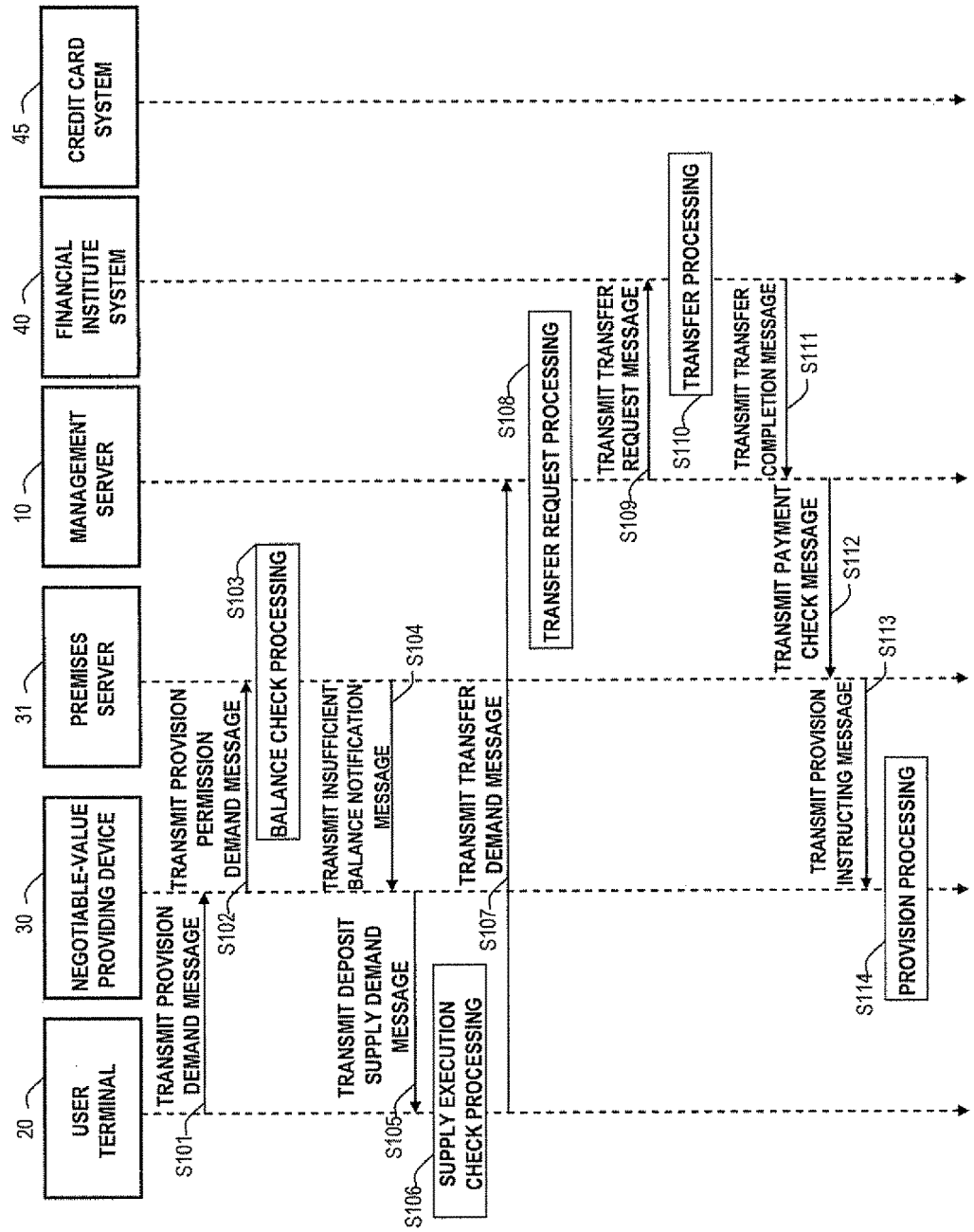
FIG. 14 is a sequential diagram showing an operation example of the settlement system according to the first embodiment.

FIG. 14 is a sequential diagram showing an operation example of the settlement system 1 according to the first embodiment. Hereinafter, the operation example of the settlement system 1 will be described with reference to FIG. 14.

First, assume that a user of the settlement system 1 enters a shop (for example, gaming facility) and wants to provide a game medium which is a negotiable-value for the play of a game. This user has already completed user registration in this system and registration of his or her premises deposit and registration of identification information of the user terminal device 20 are made in the infra-facility server 31. In addition, assume that registration of his or her bank account used for transfer processing or the like, a credit card number or the like is made in the management server 10.

First, the user causes the user terminal device 20 to provide an access to the negotiable-value providing device 30 and enables communication between these devices. The user terminal device 20 transmits a provision demand message to the negotiable-value providing device 30. The "provision demand message" used herein is information that the negotiable-value providing device 30 can recognize that provision of a negotiable-value has been demanded from a user, and may be any item of information as long as such recognition is possible. For example, this message may be data made of a combination of an IC card application identification number set for the user terminal device 20 and identification information of the user terminal device 20. The present specification assumes that a "message" is used in a sense including a signal and/or a signal train which is capable of transmitting any item of information.

The negotiable-value providing device 30 having received the provision demand message transmits to the premises server 31 a provision permission demand message which is a message inquiring the user terminal device 20 having transmitted this message as to whether or not negotiable-value provision may be executed (S102). The premises server 31 having received the provision permission demand message executes balance check processing of determining whether or not a charge of negotiable-value provision can be withdrawn from a premises deposit of a user corresponding to the user terminal device 20 (corresponding to an "amount of a user deposit) (S103). An amount of the abovementioned charge (such as uniformly 1,000 Yen, for example) is assumed to be set and registered in any device.

Although not shown in FIG. 14, in a case where withdrawal of change is possible, the premises server 31 transmits a negotiable-value provision permission message to the negotiable-value providing device 30 and then the negotiable-value providing device 30 having received the negotiable-value provision permission message provides to a user a negotiable-value of which amount corresponds to the charge.

On the other hand, in a case where the premises deposit of the user is lower than an amount of charge for a negotiable-value and withdrawal of charge is impossible, the premises server 31 transmits an insufficient charge notification message to the negotiable-value providing device 30 (S104). The "insufficient balance notification message" may be any item of information as long as the negotiable-value providing device 30 can recognize that a negotiable-value cannot be provided because the amount of the premises deposit of the user is insufficient.

The negotiable-value providing device 30 having received the insufficient balance notification message transmits a deposit supply demand message to the user terminal device 20 (S105). The "supply" used herein denotes an additional payment. The "deposit supply demand message" may be any item of information as long as the user terminal device 20 can recognize that there is a need to supply a premises deposit of the user in order to receive provision of a negotiable-value. For example, this message may be an error number denoting a supply demand or something like that. While, in the present embodiment, the deposit supply demand message includes a user's premises amount of money (for example, 1,000 Yen) to be added to a user's premises deposit and information indicating a transfer destination account which is a transfer destination of the amount of money to be added, these items of information may be stored in advance in the user terminal device 20.

The user terminal device 20 having received the deposit supply demand message prompts input of user check of executing transfer for supplying a deposit and then performs supply execution check processing for waiting for this input (S106). When a check input is made, the user terminal device 20 transmits to the management server 10 a transfer demand message which is a message demanding transfer of the amount of charge from the user bank account (corresponding to a "user account" of the present invention) to the transfer destination account (S107). While the present embodiment assumes that with respect to the transfer demand message the user terminal device 20 and the management server 10 makes communication via a mobile communication network or the like without making communication via the negotiable-value providing device 30 and/or the premises server 31, it should be noted that the present invention is limited to such a communication path. A user account which is a supply source of supplying a user deposit is not limited to a bank account and may be an account of any institute or business operator as long as it is an account from which transfer is possible.

The management server 10 having received the transfer request message executes transfer request processing of generating a transfer request message which is a message requesting transfer of the amount of money to the financial institute system 40 handing the transfer destination account, from the user bank account to the transfer destination account (S108). The user bank account may be specified by using data stored after being associated with identification information or the like of the user terminal device 20. The management server 10 transmits the generated transfer request message to the financial institute system 40 (S109).

The financial institute system 40 having received the transfer request message performs transfer processing which is processing of transferring the amount of the charge from the user bank account to the transfer destination account (S110). In a case where transfer has normally completed, the financial institute system 40 transmits a transfer completion message to the management sever 10 (S111).

The management server 10 having received the transfer completion message transmits to the premises server 31 a payment check message which is a message notifying that payment of the amount of money to be added to the user's premises deposit has been performed (S112). The premises server 31 having received the payment check message specifies an insufficient balance notification message corresponding to a payment conformation message (see S104) and then transmits a provision instructing message to the negotiable-value providing device 30 which is a transmission destination of the specified insufficient balance notification message (S113). The negotiable-value providing device 30 having the provision instructing message executes provision processing which is processing of providing a negotiable-value corresponding to the amount of money (S114). By providing the negotiable-value, processing of the provision demand message performed in step S101 in the present system completes and the user obtains the negotiable-value.

[2.1. Modification Example 1]

Next, a modification example of the foregoing embodiment will be described.

Figure 15:
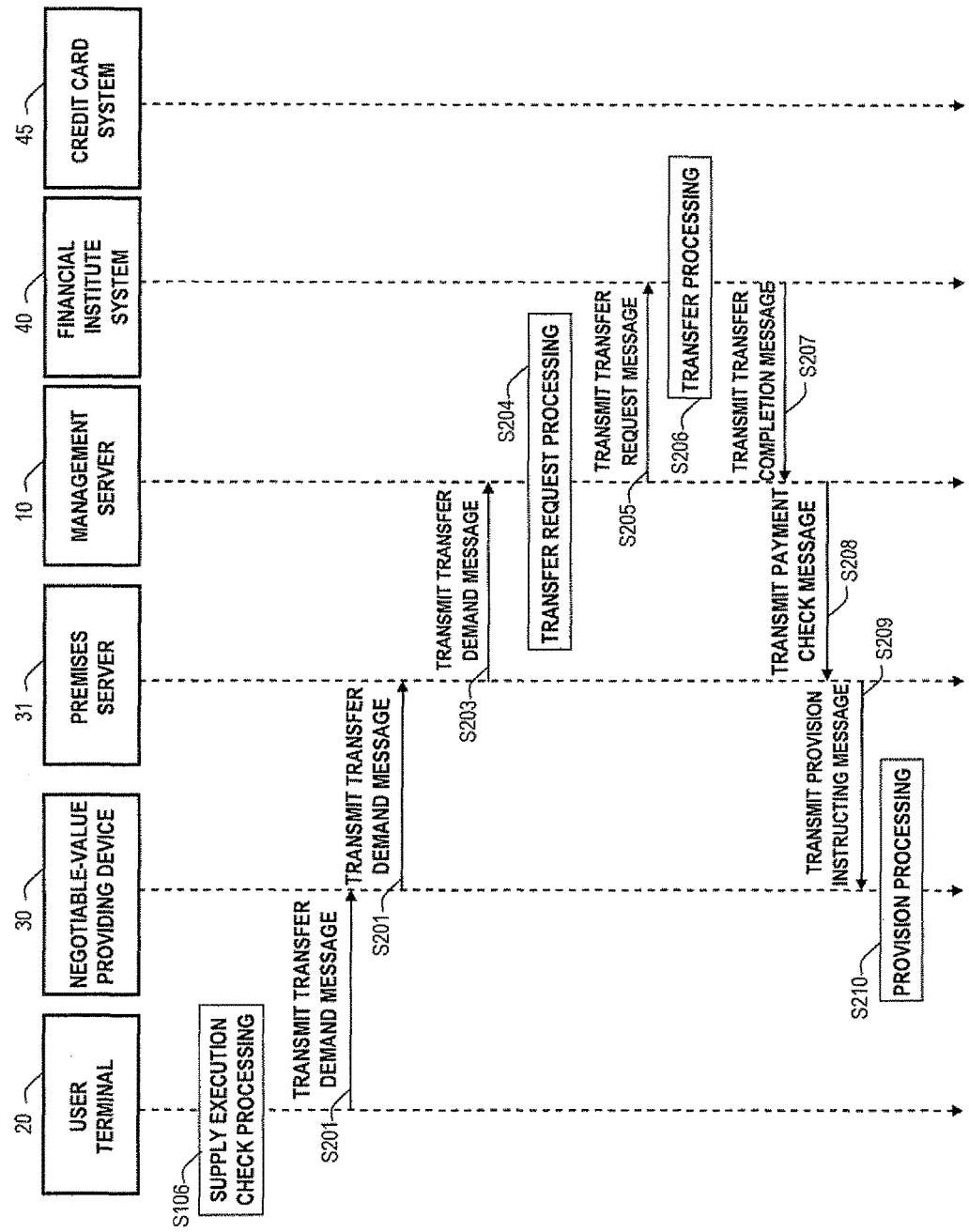
FIG. 15 is a sequential diagram showing an operation example of a modification example of the first embodiment.

While, in the forgoing embodiment, in step S107, the user terminal device 20 was configured to transmit a transfer demand message to the management server 10 via a mobile communication network or the like, the present invention is applicable even if this transfer demand message is modified so as to be transmitted to the management server 10 via the negotiable-value providing device 30 and the premises server 31. An operation of this modification example will be described with reference to FIG. 15, FIG. 15 is a sequential diagram showing an operation example of this modification example.

Now, assume that the supply execution check processing in step S106 shown in FIG. 14 is performed by the user terminal device 20 and a user has inputted check. The user terminal device 20 having accepted cheek input transmits to the negotiable-value providing device 30 a message demanding transfer of the amount of money from the user bank account to the transfer destination account (S201). In this modification example, the transfer destination account and the amount of money are not included in a transfer demand message. These items of information are stored in advance in the premises server 31 or the management server 10 so as to use them.

In addition, an action of a user causing the user terminal device 20 and the negotiable-value providing device 30 to communicate with each other again may be used in place of the user check input. For example, the present embodiment is applicable if the user terminal device 20 mounting a noncontact-type IC card is used in place of the user check input by an action of holding the user terminal device 20 mounting the noncontact-type IC card up to a noncontact-type IC card reader portion of the negotiable-value providing device provided with a noncontact-type IC card reader.

The negotiable-value providing device 30 transmits a transfer demand message to the premises server 31 (S202) and the premises server 31 transmits the transfer demand message to the management server 10 (S203). Afterwards, the processing operations of step S204 to S210 shown in FIG. 15 are executed. Step S204 to step S210 are processes of the same contents corresponding to those of step S108 to step S114 shown in FIG. 14, respectively. Therefore, a description of the processing contents is omitted.

[2.2. Modification Example 2: Case of Insufficient Balance in Bank Account]

Figure 16:
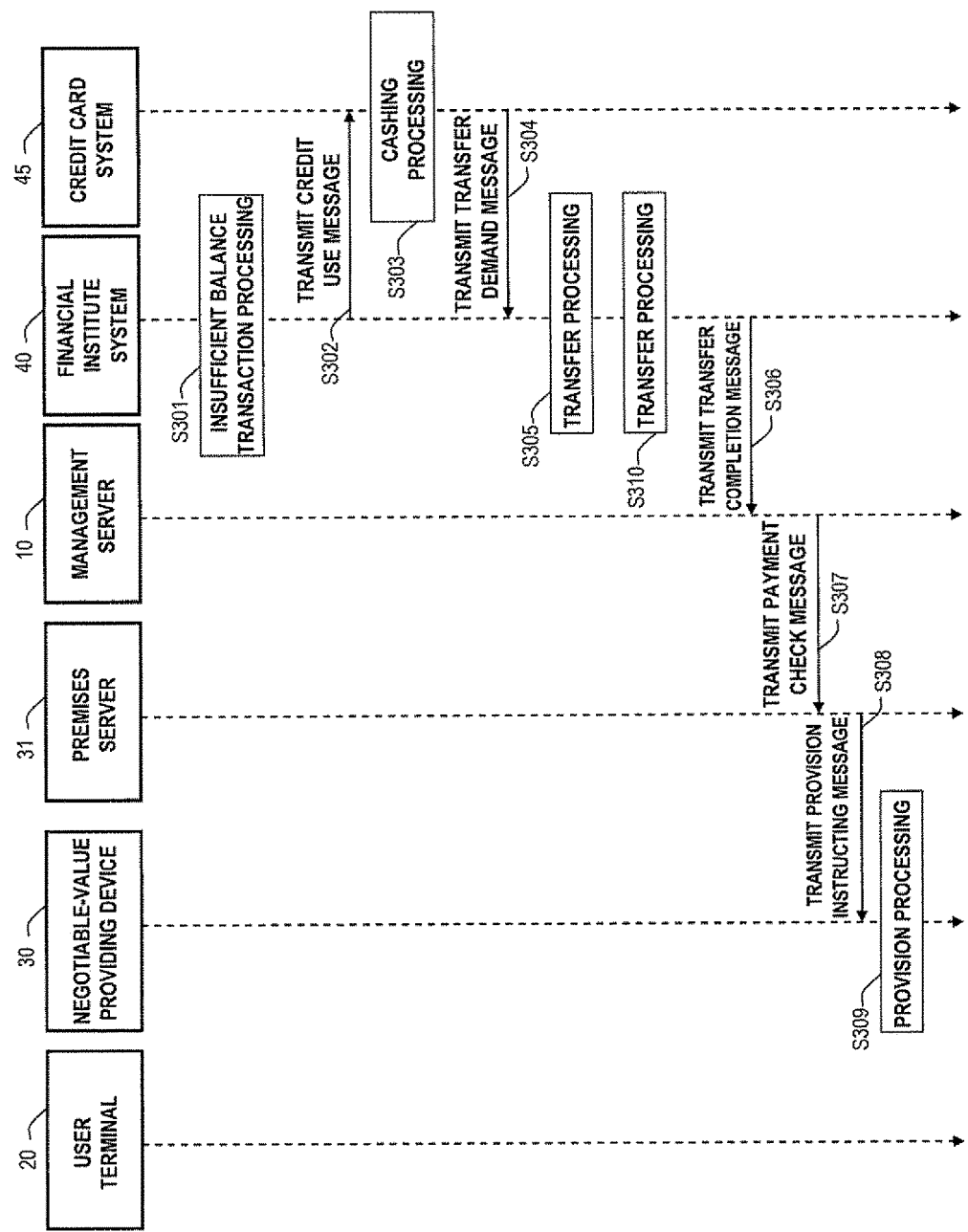
FIG. 16 is a sequential diagram showing an operation example of a settlement system in a case of utilizing a credit card.

In the process of step S110 in FIG. 14, a description was given assuming that the balance in a user bank account is sufficient for an amount of transfer. Although there may be processing of, in a case where the balance in the user bank account is insufficient, returning notification of impossible transfer from the financial institute system 40 to the management server 10 and then disabling negotiable-value provision, the present embodiment is applicable if there is employed a configuration of disabling negotiable-value provision by making payment from the user credit card to the user bank account. FIG. 16 shows an operation example of the settlement system 1 in a case of enabling negotiable-value provision by making payment from the user credit card to the user bank account.

Assume that step S109 (see FIG. 14) or step S205 (see FIG. 15) is performed. If the balance in a user bank account (for example, 500 Yen) is less than an amount of transfer demand (for example, 1,000 Yen), the financial institute system 40 executes insufficient balance transaction processing (S301). The insufficient balance transaction processing is processing of transferring to a user bank account an amount of money preset in an online settlement system (hereinafter, referred to as a "credit card system") of a credit card company handling a credit card preset in the user bank account.

Subsequent to the insufficient balance transaction processing (S301), the financial institute system 40 transmits a credit use message to the credit card system 45 (S302). The credit card system 45 transmits to the financial institute system 40 a transfer demand message demanding transfer of a set amount of money to a user bank account in response to the credit use message (S303). The financial institute system 40 having received the transfer demand message performs processing of transferring a set amount of money (for example, 50,000 Yen) to the user bank account (S305). Afterwards, the financial institute system 40 transfers an amount of payment (for example, 1,000 Yen) as a user's premises deposit from the user bank to a bank account for receiving the premise deposit (such as bank account of managing company of game facilities in which premises server 31 is installed or bank account of managing company of this system) (S310). While, in the abovementioned processing, it was described that the financial institute system 40 is configured to transfer a credit use message to the credit card system 45 (see S302), it should be noted that the present embodiment is limited to such a configuration. The present embodiment is applicable if there is employed a configuration in which the financial institute system 40 transmits a message notifying insufficient balance to the management server 10 and then the management server 10 having received this message transmits a credit use message to the credit card system 45. At this time, the management server 10 may be configured to transmit a message prompting check of intention of credit use to a user so as to receive a message indicating check of intention of credit use from a user terminal and then transmit a credit use message to the credit card system 45 in the case of receipt of such a message.

On the other hand, in a case where transfer has normally completed, the financial institute system 40 transmits a transfer completion message to the management server 10 (S306). The management server 10 having received the transfer completion message transmits to the premises server 31 a payment completion message which is a message notifying that payment of the amount of money (1,000 Yen in the example described previously) has been made for the user's premises deposit (S307). The premises server 31 having received the payment check message specifies an insufficient balance notification message (see S104) corresponding to the payment check message and then transmits a provision instructing message to the negotiable-value providing device 30 which is a transmission destination of the specified insufficient balance notification message (S308). The negotiable-value providing device 30 having received this provision instructing message executes provision of a negotiable-value corresponding to the amount of money (S309).

With such a configuration, even if the balance in a user bank account is insufficient, a user can receive provision of a negotiable-value immediately without deviating from a set amount of money.

Second Embodiment

A second embodiment of the present invention will be described.

[3.1. Configuration Example of Settlement System]

A settlement system according to a second embodiment is similar to the configuration of the settlement system 1 according to the first embodiment. A difference from the settlement system 1 according to the first embodiment is that in a case where the balance in a user bank account is insufficient, a user terminal device 20 executes processing of causing a user to supply an instruction for making payment from a credit card to the bank account.

[3.2 Operation Example of System]

Figure 17:
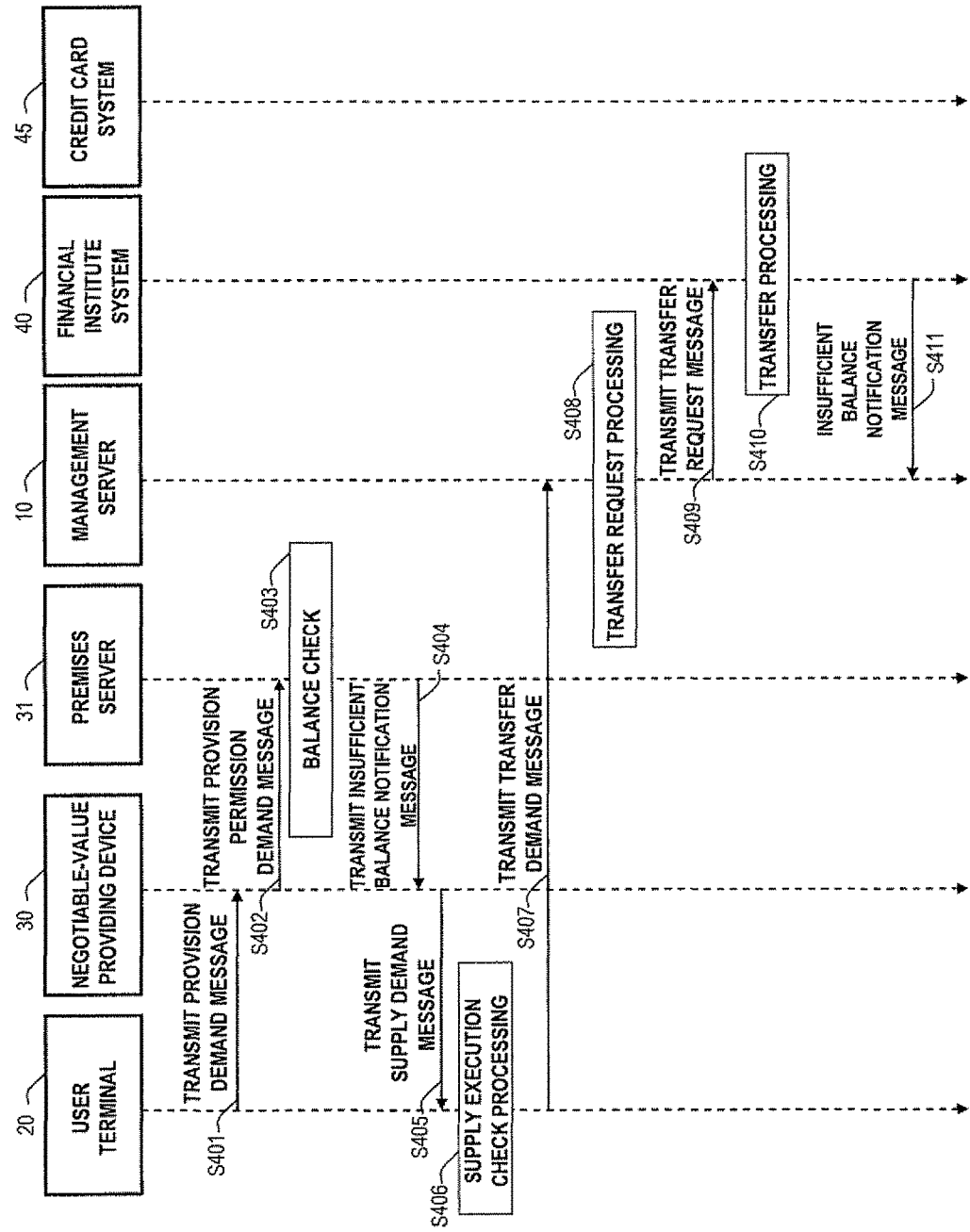
FIG. 17 is a sequential diagram showing an operation example of a settlement system according to a second embodiment.
Figure 18:
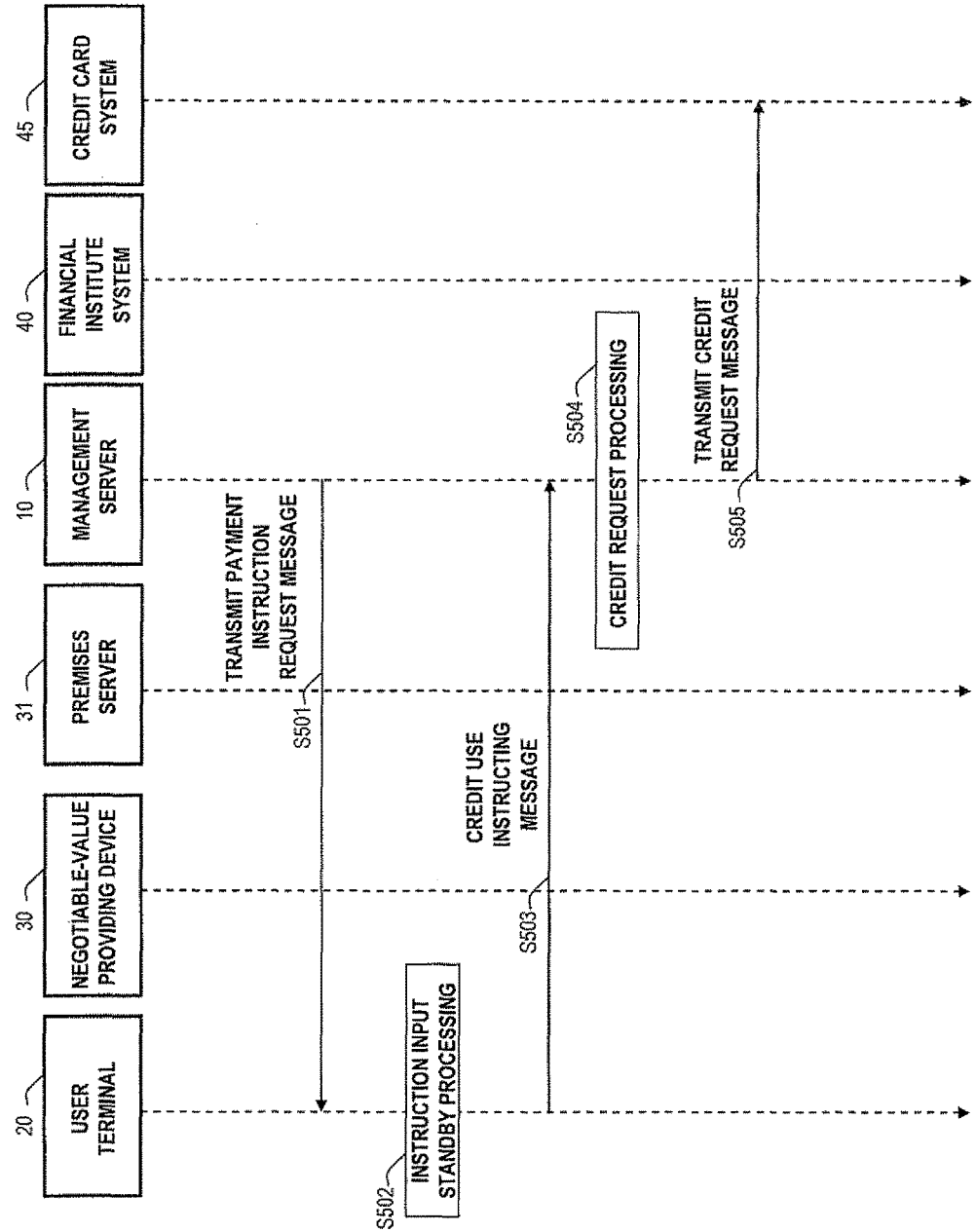
FIG. 18 is a diagram showing a sequence subsequent to that of FIG. 17.
Figure 19:
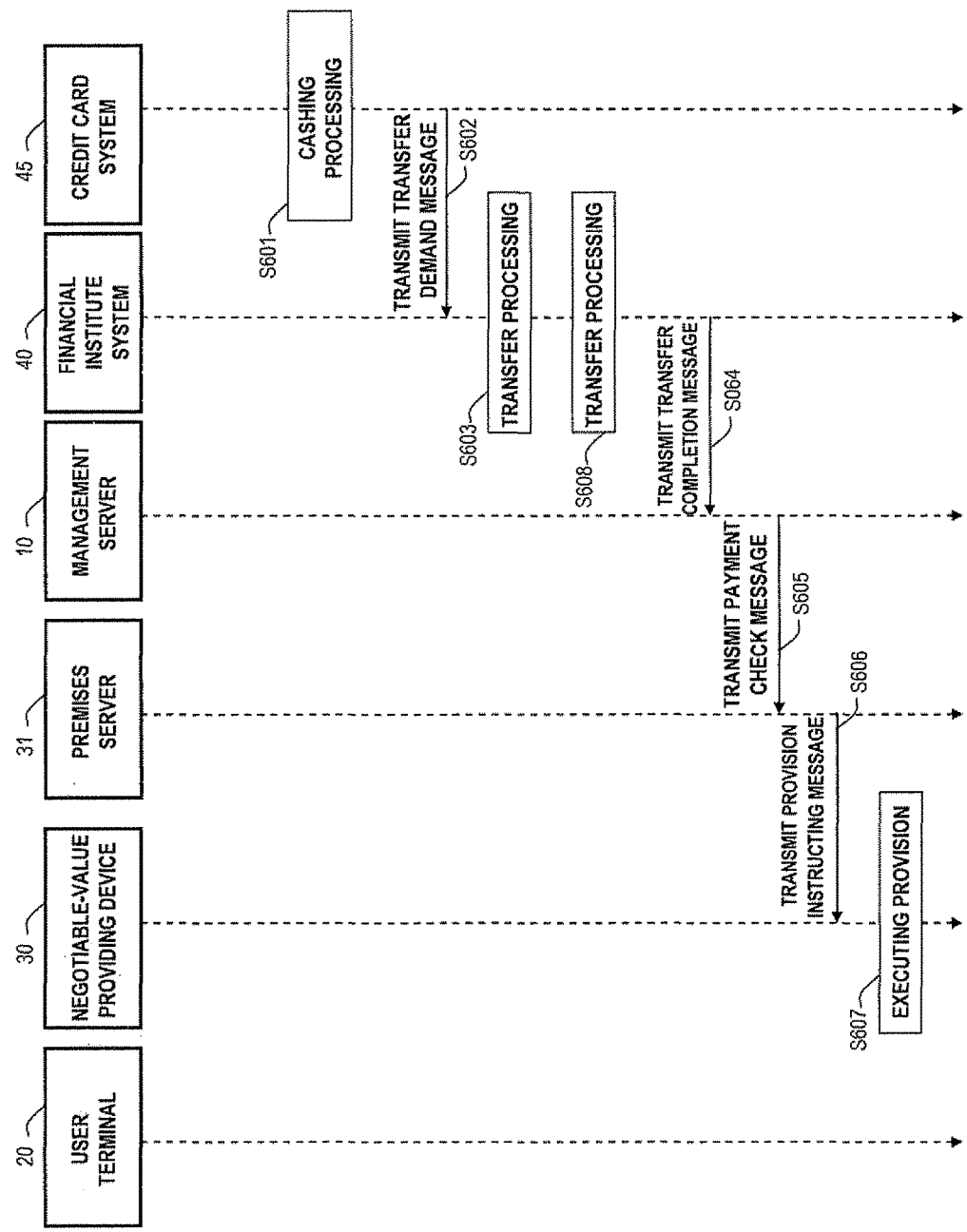
FIG. 19 is a diagram showing a sequence subsequent to that of FIG. 18.

An operation example of the settlement system according to the second embodiment will now be described. FIG. 17, FIG. 18, and FIG. 19 are sequential diagrams showing operation example of the settlement system according to the second embodiment; FIG. 18 is a diagram showing a sequence subsequent to that of FIG. 17; and FIG. 19 are a diagram showing a sequence subsequent to that of FIG. 18.

First, the processing operations of step S401 to step S409 shown in FIG. 17 are executed. The contents of the processing operations of step S401 to step S409 are the same as and correspond to those of step S101 to S109 shown in FIG. 14. Therefore, a description of the processing contents of these steps, i.e., step S401 to step S409 is omitted.

The financial institute system having received a transfer demand message transmitted in step S409 attempts to execute transfer processing (S410). Hereinafter, a subsequent operation will be described assuming that the balance in a user bank account is insufficient. An operation in a case where the balance in a bank account is sufficient to an extent such that transfer is possible is similar to that of step S110 to step 114 in the first embodiment.

A financial institute system 40 having recognized that the balance in a user bank account (for example, 500 Yen) is insufficient for a demanded amount of transfer (for example, 1,000 Yen) in step S410 transmits to a management server 10 an insufficient balance notification message notifying that the balance in the user bank account is insufficient (S411).

The management server 10 having received the insufficient balance notification message transmits a payment instruction demand message to a user terminal device 20 (FIG. 18, S501). The payment instruction demand message is a message demanding a user for an input of instructing a payment from a credit card to a user bank account. The user terminal device 20 having received the payment instruction demand message executes instruction input standby processing of displaying an input screen demanding an input of instructing a payment from a credit card to a user bank account and then waiting for a user input (S502). In the instruction input standby processing, for example, a liquid crystal display of the user terminal device 20 is caused to display a message such as "THE BALANCE IN YOUR BANK ACCOUNT IS INSUFFICIENT. DO YOU WANT TO PAY AN INITIAL SET AMOUNT OF MONEY (50,000 YEN) FROM YOUR CREDIT CARD TO YOUR BANK ACCOUNT? <OK>"; and in a case where a user has make a predetermined operation (for example, depressing a determination button) after this screen display has been made, it is handled that a payment instruction input from a credit card to a bank account has been made. While the abovementioned example showed that the initial set amount of money is paid, as a matter of course a user may be able to specify an amount of payment.

The user terminal device 20 having accepted the user instruction input transmits a credit use instructing message to the management server 10 (S503). Any credit use instructing message is available as long as it is information and/or data from which it is identified that the user instruction input has been made for the payment instruction demand message described previously.

The management server 10 having received the credit use instructing message executes credit request processing (S504). The credit request processing is processing of transferring an amount of money set in a card system, which is registered in the management server 10, to the bank account.

Subsequent to the credit request processing (S504), the management server 10 transmits a credit demand message to a credit card system 45 (S505). The credit demand message is a message demanding transfer of a predetermined amount of money, as use of a credit card, to a user bank account.

Afterwards, the processing operations of step S601 to step S609 shown in FIG. 19 are performed and then a negotiable-value is provided to a user. The contents of the processing operations of step S601 to step S609 are identical to those of step S303 to S310 described in the first embodiment. Therefore, a description of the contents of these processing operations is omitted.

Third Embodiment

Next, a description of a third embodiment will be given.

A feature of a settlement system according to the third embodiment is that a user can purchase a negotiable-value using so called electronic money. In addition, if the balance in a user bank account or electronic money is insufficient, the balance can be supplied with another fund.

[4.1. Configuration Example of Settlement System]

Figure 20:
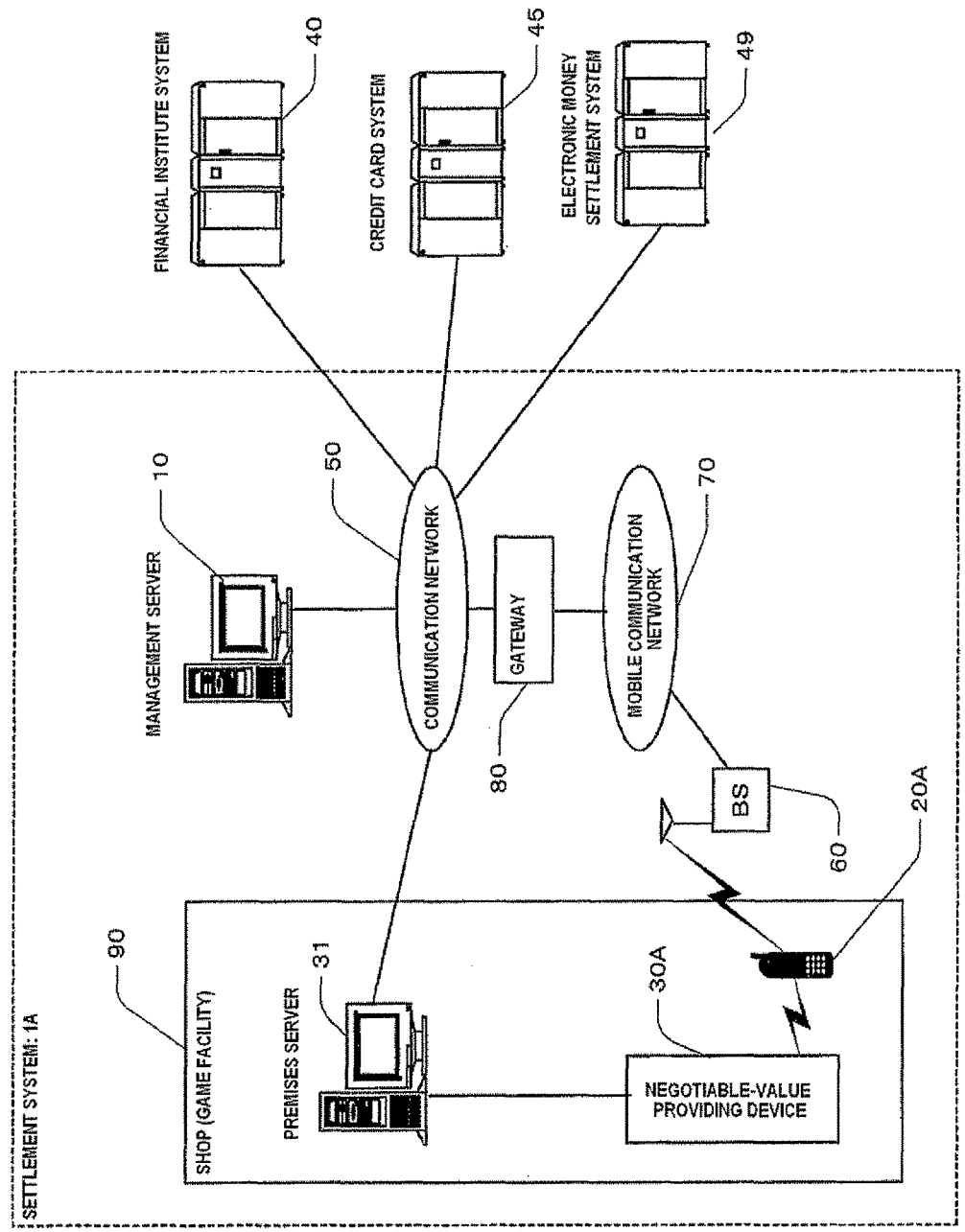
FIG. 20 is a block diagram depicting a configuration example of a settlement system according to a third embodiment.

FIG. 20 shows a configuration example of a settlement system according to the third embodiment. A settlement system 1A according to the third embodiment is basically similar to the settlement system 1 according to the first embodiment shown in FIG. 1. However, an electronic money settlement system 49 is connected to a communication network 50 and a user terminal device 20A and a negotiable-value providing device 30A are different from the user terminal device 20 and the negotiable-value providing device 30 in that a configuration of enabling use of electronic money is added.

The electronic money settlement system 49 is a system for summing to a use amount of user electronic money and then performing transfer processing for an account of a payment destination or performing required processing in response to a demand for charge for electronic money.

Figure 21:
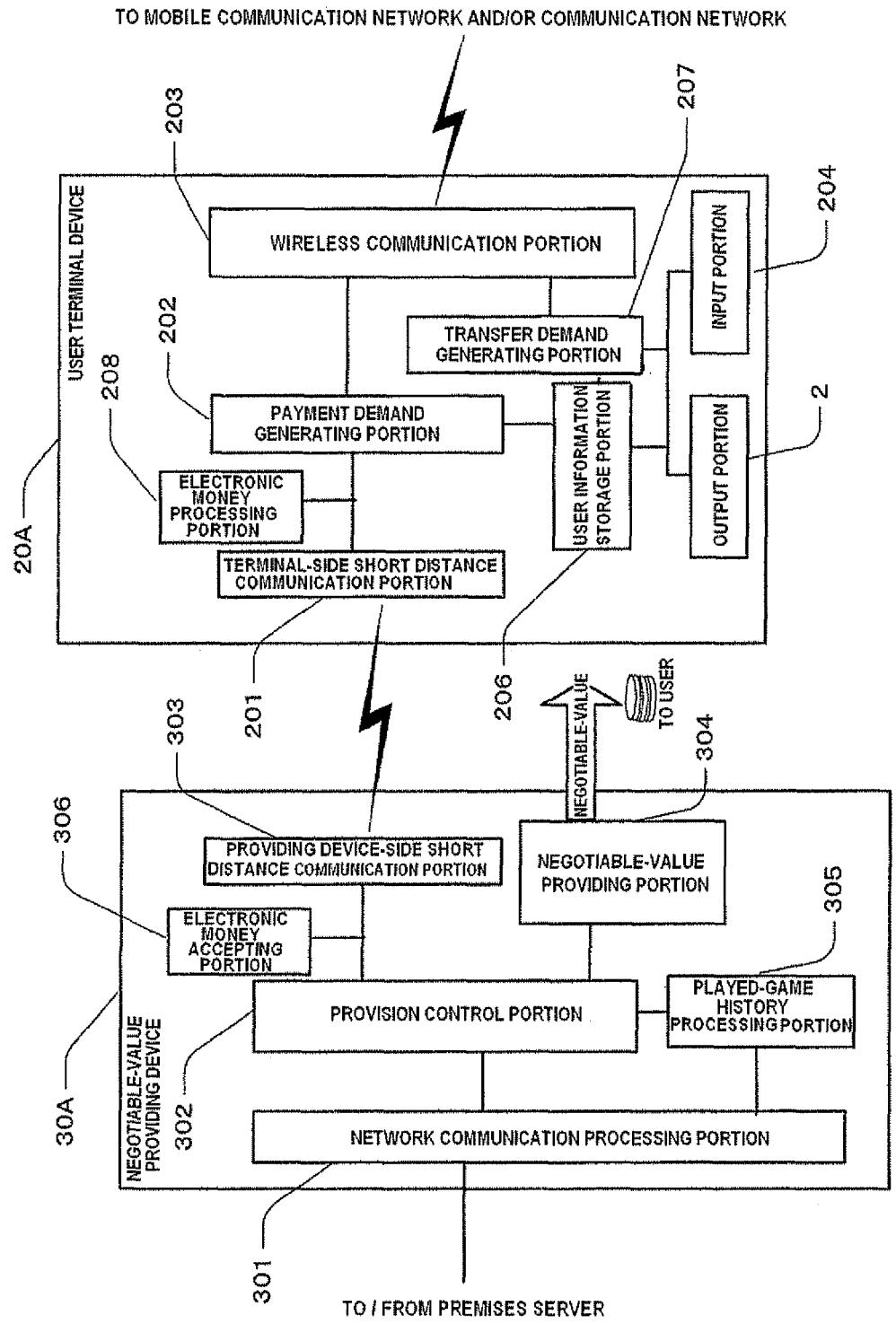
FIG. 21 is a functional block diagram depicting a configuration example of a user terminal device and a negotiable-value providing device according to the third embodiment.

FIG. 21 shows a configuration example of the user terminal device 20A and the negotiable-value processing device 30A.

The user terminal device 20A has constituent elements which are basically similar to those of the user terminal device 20 described previously. Same constituent elements are designated by same reference numerals and a description of these elements is omitted. The user terminal device 20A is different from the user terminal device 20 described previously in that it further has an electronic money processing portion 208 connected to a terminal-side short distance communication portion 201 and a payment demand generating portion 202. The electronic money processing portion 208 has a function of consuming electronic money or managing an additional charge or the like.

The negotiable-value providing device 30A has constituent elements which are basically similar to those of the negotiable-value providing device 30 described previously. Same constituent elements are designated by same reference numerals and a description of these elements is omitted. The negotiable-value providing device 30A is different from the negotiable-value providing device 30 described previously in that it further has an electronic money accepting portion 306 connected to a providing device-side short distance communication portion 303 and a provision control portion 302. The electronic money accepting portion 306 has a function of performing acceptance, authentication, payment storage, accumulation, and/or management or the like of a payment demand utilizing electronic money.

[4.2. Operation Example of Settlement System]

Figure 22:
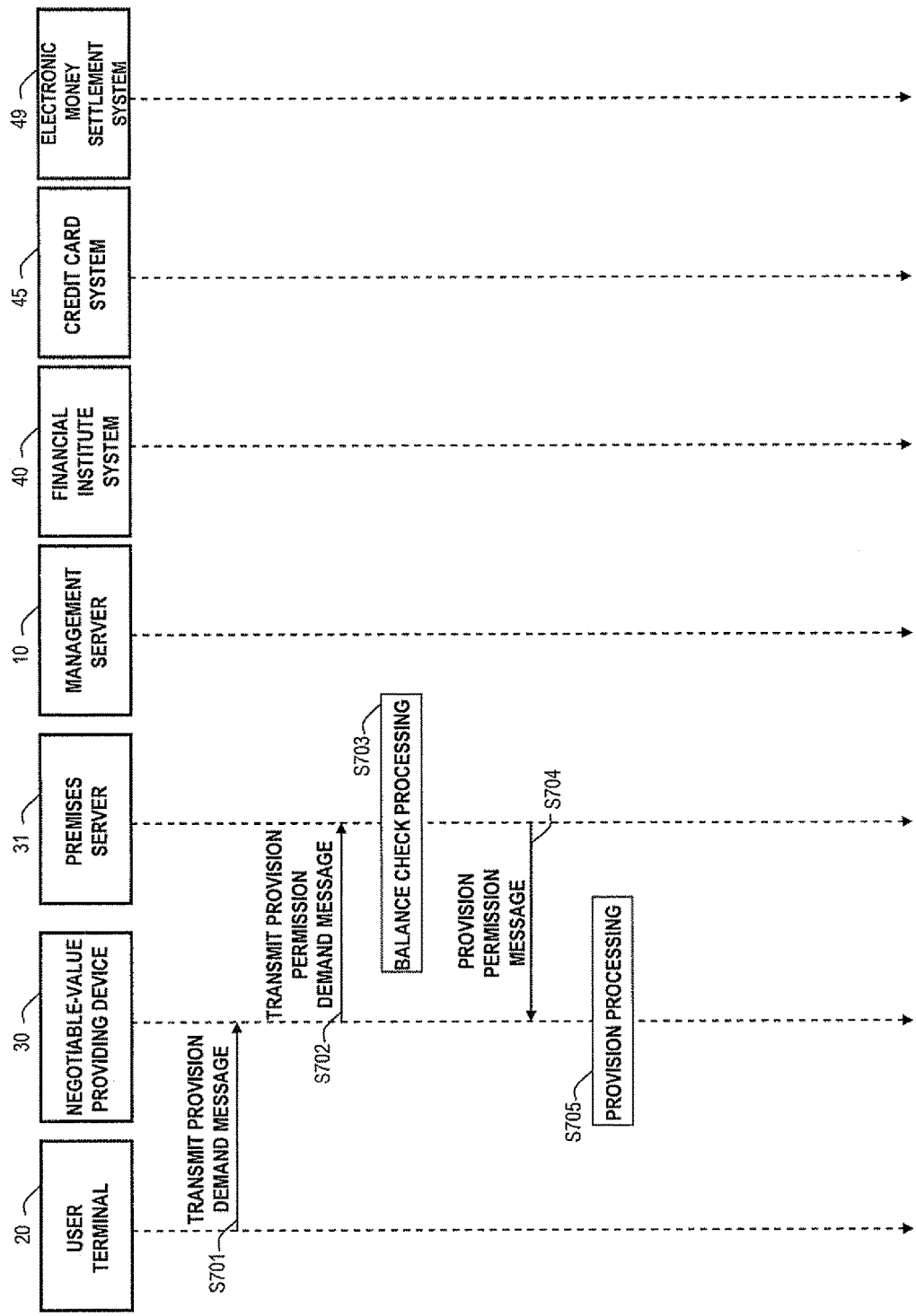
FIG. 22 is a sequential diagram showing an operation example of the settlement system according to the third embodiment.
Figure 23:
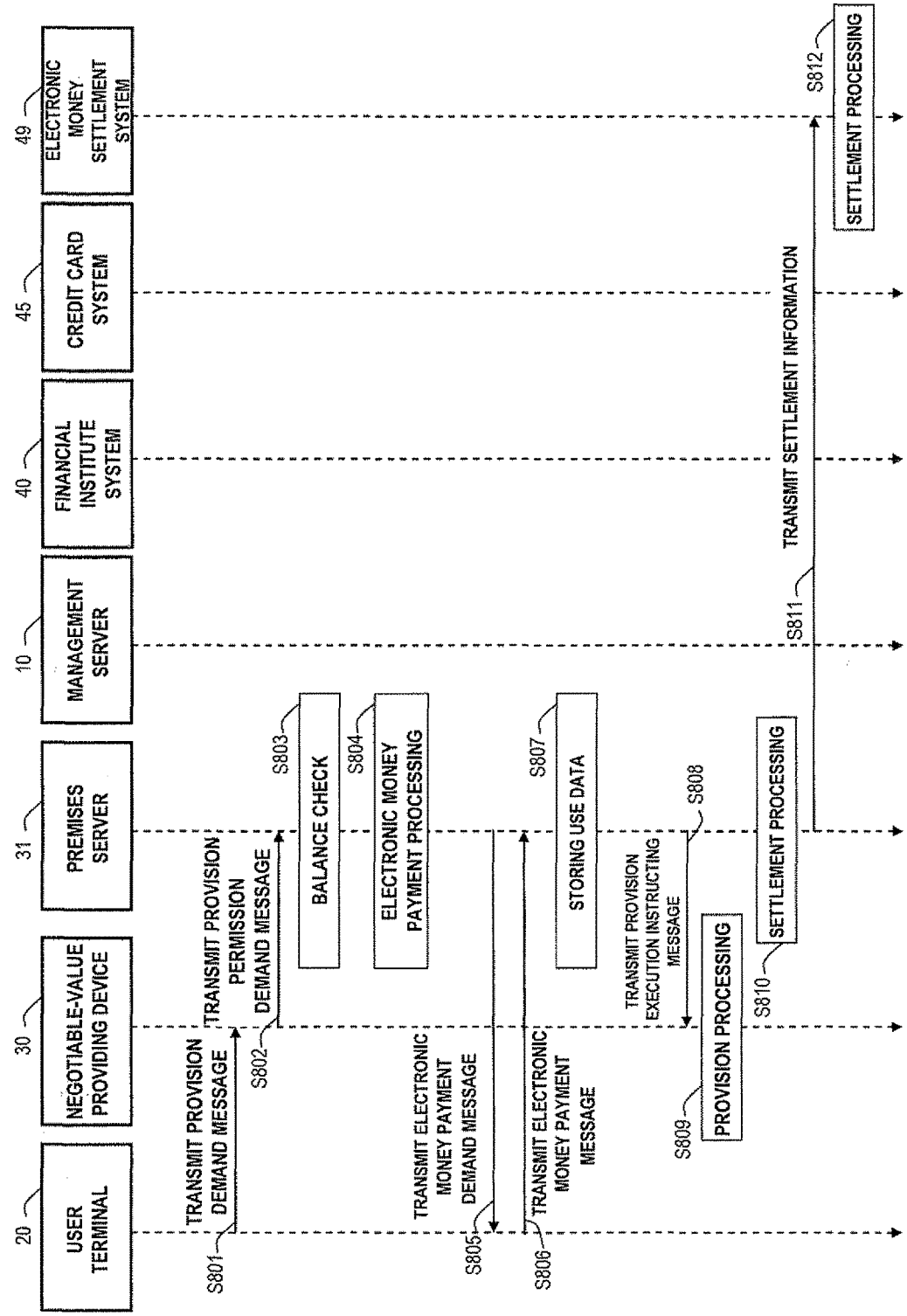
FIG. 23 is a sequential diagram showing an operation subsequent to that of FIG. 22.
Figure 24:
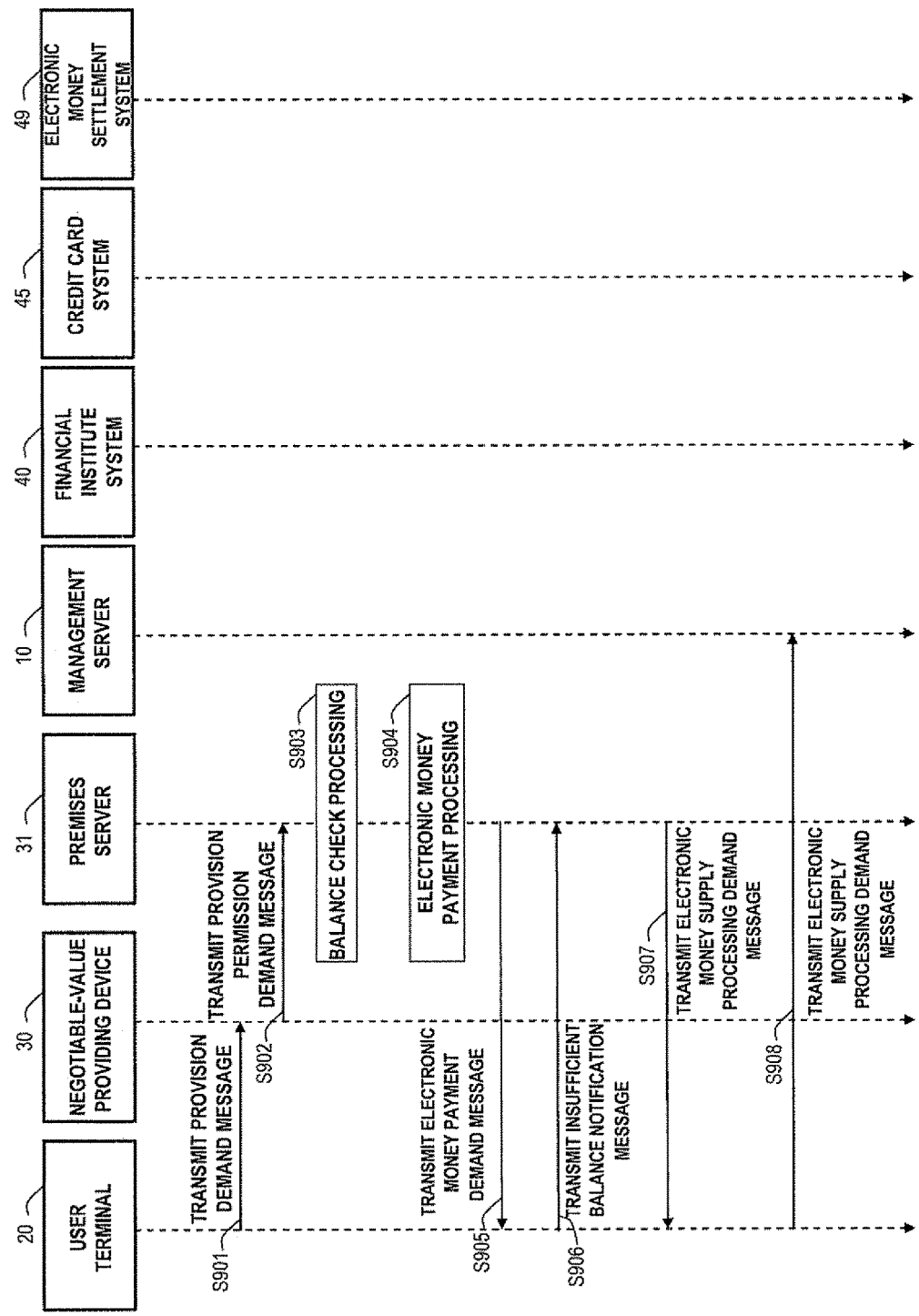
FIG. 24 is a sequential diagram showing an operation subsequent to that of FIG. 23.
Figure 25:
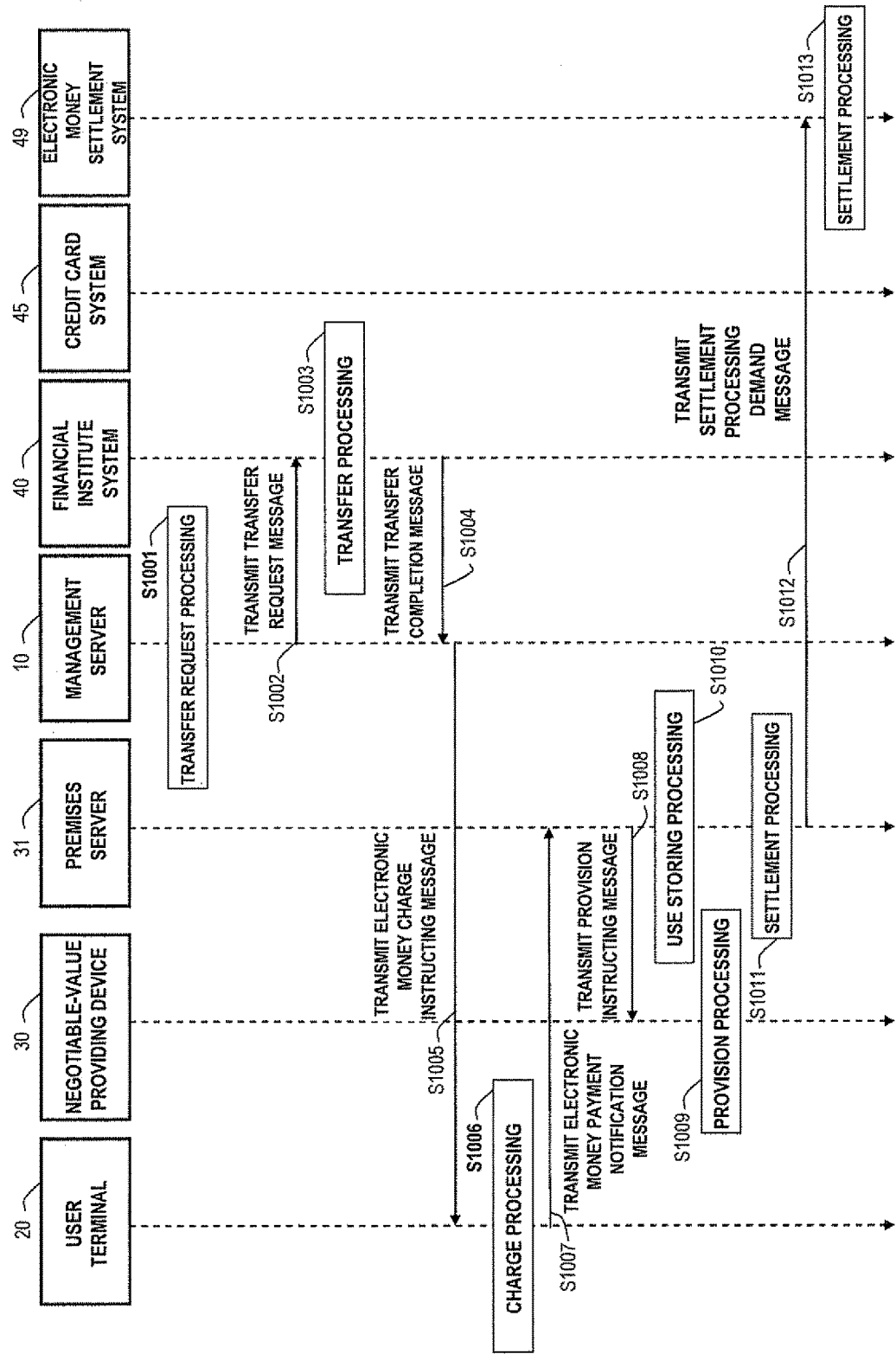
FIG. 25 is a sequential diagram showing an operation subsequent to that of FIG. 24.

FIG. 22 to FIG. 26 are sequential diagrams showing operation examples of the settlement system according to the third embodiment. Hereinafter, operation examples of the settlement system according to the present embodiment will be described with reference to FIG. 22 to FIG. 26. FIG. 22 is a sequential diagram showing an operation example of this settlement system; FIG. 23 is a sequential diagram showing an operation subsequent to that of FIG. 22; FIG. 24 is a sequential diagram showing an operation subsequent to that of FIG. 23; FIG. 25 is a sequential diagram showing an operation subsequent to that of FIG. 24; and FIG. 26 is a sequential diagram showing an operation example in a case where the balance in a user bank account is insufficient.

Assumptions of this explanation will be described as follows. Assume that a user of this settlement system enters a short (for example, game facility) and wants to provide a gaming medium which is a negotiable-value for the play of a game. This user has already completed user registration in this system and registration of the user premises deposit and registration of identification information of the user terminal device 20 are made in the premises server 31. In addition, assume that registration of his or her bank account, a credit card number or the like is made in the management server 10. Further, a description will be given assuming that 1,000 Yen is registered as the user's premises deposit in the premises server 31 and 1,000 Yen is accumulated as electronic money in the user terminal device 20.

First, the user causes the user terminal device 20 to be proximal to the negotiable-value providing device 30 and enables communication between these devices. The user terminal device 20 transmits a provision demand message to the negotiable-value providing device 30 (S701).

The negotiable-value providing device 30 having received the provision demand message transmits to the premises server 31 a provision permission demand message which is a message inquiring the user terminal device 20 having transmitted the provision demand message as to whether or not negotiable-value provision may be executed (S702). The premises server 31 executes balance check processing of determining whether or not a charge for providing a negotiable-value can be withdrawn from the premises deposit of a user corresponding to this user terminal device 20 (S703). An amount of charge is assumed to be preset in any device (in this explanatory example, 1,000 Yen is preset.)

In this example, since withdrawal of a charge is possible, the premises server 31 transmits a negotiable-value provision permission message to the negotiable-value providing device 30 (S704). At this time, the premises server 31 subtracts 1,000 Yen for charge for negotiable-value provision from 1,000 Yen for the premises deposit and records the balance of the premises deposit of this user as 0 Yen.

The negotiable-value providing device 30 having received the negotiable-value provision permission message performs provision processing of providing to a user a negotiable-value of which amount corresponds to the charge (S705).

Next, the present embodiment describes a case in which a user's premises deposit is lower than an amount of payment and withdrawal of a charge is impossible. This description will be given with reference to FIG. 23 assuming that: a user having received provision of the negotiable-value (see S705) has used up the negotiable-value, but wants to further continue the play of a game; and the user causes the user terminal device 20 to be proximal to the negotiable-value providing device 30 again and then enables communication between these devices.

The user causes the user terminal device 20 to be proximal to the negotiable-value providing device 30 and then enables communication between these devices. The user terminal device 20 transmits a provision demand message to the negotiable-value providing device 30 (S801).

The negotiable-value providing device 30 having received the provision demand message transmits to the premises server 31 a provision permission demand message which is a message demanding permission of providing a negotiable-value to the user terminal device 20 having transmitted the provision demand message (S802). The premises server 31 executes balance check processing (S803). At this time, the balance of the user's premises deposit is 0 Yen.

In a case where it is determined that there is no premise balance sufficient for payment of negotiable-value provision in balance check processing (S803), the premises server 31 executes electronic money payment processing which is processing of demanding the user terminal device 20 to make payment of charge by utilizing electronic money (S804). As a result of executing electronic money payment processing, the premises server 31 transmits to the user terminal device an electronic money payment demand message which is a message demanding a payment of change by utilizing electronic money (S805).

The user terminal device 20 having received the electronic money payment demand message checks whether or not the balance of electronic money recorded in this user terminal device 20 is sufficient for payment of charge. In a case where the balance is sufficient (the subsequent description is given assuming that the balance is sufficient), this user terminal device transmits to the premises server 31 an electronic money payment message which is a message notifying that the charge will be paid by means of electronic money (S806). In addition, together with this message transmission, the user terminal device 20 subtracts the charge from the recorded the balance of electronic money. Hereinafter, a description will be continued assuming that: a charge for 1,000 Yen is subtracted from the balance of electronic money 1,000 Yen; and the balance of electronic money has become 0 Yen.

The premises server 31 having received the electronic money payment message executes use storage processing which is processing of recording that electronic money 1,000 Yen of a user corresponding to this user terminal device 20 has been paid as a charge for a negotiable-value, based on the contents of the electronic money payment message (S807).

In addition, the premises server 31 transmits a negotiable-value provision instructing message to the negotiable-value providing device 30 (S808) and then the negotiable-value providing device 30 performs provision processing which is processing of providing to a user a negotiable-value of which amount corresponds to the charge (S809).

Subsequently, the premises server 31 executes settlement processing of summing up information of electronic money paid as a charge for a negotiable-value (S810), based on the contents of recording recorded in step S807, and then, transmits settlement information which is generated as a result of the settlement processing to the electronic money settlement system 49 (S811). The electronic money settlement system 49 having received the settlement information specifies a bank account as a payment destination of electronic money and then executes settlement processing such as transferring a corresponding amount of money to the bank account (S812). The present invention is applicable irrespective of when and with what sense of feeling the processing operations of step S810 to step S812 are executed.

[4.3. Operation Example in a Case where Balance of Electronic Money is Insufficient]

Next, an operation example in a case where the balance of electronic money stored in the user terminal device 20 is insufficient for payment of charge will be described with reference to FIG. 24. The subsequent description will be given assuming that a user's premises deposit stored in the premises server 31 and the electronic money in the user terminal device 20 are already used up and both of them becomes 0 Yen.

First, a description will be given assuming that a user (see FIG. 23, S809) having received provision of the negotiable-value has used up a negotiable-value, but wants to further continue the play of a game and then the user has make the user terminal device 20 proximal to the negotiable-value providing device 30 again.

The user causes the user terminal device 20 to be proximal to the negotiable-value providing device 30 and then enables communication between these devices. The user terminal device 20 transmits a provision demand message to the negotiable-value providing device 30 (S901).

The negotiable-value providing device 30 having received the provision demand message transmits a provision permission demand message to the premises server 31 (S902). The premises server 31 executes balance check processing (S903). At this time, the balance of a user's premises deposit becomes 0 Yen.

In a case where it is determined that there is no premise deposit sufficient for a charge for negotiable-value provision in the balance check processing (S903), the premises server 31 executes electronic money payment processing which is processing of demanding the user terminal device 20 to pay the charge by utilizing electronic money (S904). As a result of executing electronic money payment processing, the premises server 31 transmits to the user terminal device 20 an electronic money payment demand message which is a message demanding the user terminal device 20 to make payment of the charge by utilizing electronic money (S905).

The user terminal device 20 having received the electronic money payment demand message checks whether or not the balance of electronic money recorded in this user terminal device 20 is sufficient for payment of the charge. The subsequent description is given assuming that the balance of electronic money has already been 0 Yen. The user terminal device 20 transmits to the premises server an insufficient balance notification message which is a message notifying that the balance of electronic money recorded in the user terminal device 20 is insufficient for payment of the charge (S906). The premises server 31 having received the insufficient balance notification message transmits an electronic money supply processing demand message which is a message demanding the user terminal device 20 to supply an additional amount of money to the current electronic money (S907). The user terminal device 20 having received the electronic money supply processing demand message is connected to the management server 10 via a communication network and then transmits to the management server 10 the electronic money supply demand message which is a message demanding the management server 10 to supply electronic money (S908).

An operation example subsequent to the step S908 and subsequent will be described with reference to FIG. 25.

The management server 10 having received the electronic money supply demand message generates a transfer request message which is a message demanding the financial institute system 40 handing a user bank account to transfer an amount of money (hereinafter, referred to as an amount of electronic money supply) to be supplied from the balance of the user bank account to an electronic money handling account (account for transferring the cash when electronic money has been charged by cash) (S1001). The management server 10 transmits the generated transfer request message to the financial institute system 40 (S1002). The abovementioned step S1001 and step S1002 each are merely provided as an example in the settlement system 1 and the present embodiment is applicable in a case where a configuration following the sequences or procedures defined by each electronic money settlement system 49 is employed.

The financial institute system 40 having received the transfer request message executes transfer processing which is processing of transferring the amount of electronic money supply from the user bank account to the transfer destination account (S1003). In a case where transfer has normally completed, the financial institute system 40 transmits a transfer completion message to the management server 10 (S1004). Processing in a case where the balance in the user bank account is insufficient and is not sufficient for the amount of electronic money supply will be additionally described later.

The management server 10 having received the transfer completion message transmits to the user terminal device 20 an electronic money charge instructing message which is a message demanding supply of electronic money for the amount of electronic money supply (S1005).

The user terminal device 20 having received the electronic money charge instructing message executes charge processing which is processing of adding the amount of electronic money supply as his or her electronic money (S1006).

The user terminal device 20 having completed the charge processing transmits an electronic money payment message which is a message notifying to the premises server 31 that a charge for a negotiable-value will be paid using electronic money (S1007).

Afterwards, the processing operations of step S1008 to step S1013 shown in FIG. 25 are executed. The contents of these processing operations are identical to those of step S807 to step S812 described with reference to FIG. 23. Therefore, a detailed description of the contents of these processing operations is omitted.

[4.4. Operation Example in a Case where the Balance in User Bank Account is Insufficient]

Next, a description will be given with respect to a case in which where the transfer request message described previously has been transmitted from the management server 10 to the financial institute system 40 (see FIG. 25, steps S1002, S1003), the balance in a user bank account is not insufficient for an amount of electronic money supply.

In a case where the transfer in step S1003 described previously cannot be executed because the balance in the user bank account is not sufficient for the amount of electronic money, the financial institute system 40 executes insufficient balance transaction processing (S1101). The insufficient balance transaction processing is processing of generating an insufficient balance notification message notifying to the management server 10 that the balance in the user bank account is not sufficient for the amount of electronic money supply. This message may include a network address of a credit company system as a transmission destination of a credit demand message to be described later, a user credit number, a personal identification number or the like. The financial institute system 40 transmits the generated insufficient balance notification message to the management server 10 (S1102).

The management server 10 having received the insufficient balance notification message transmits a credit use message to the credit card system 45 (S1103). The credit card system 45 transmits to the financial institute system 40 a transfer demand message demanding the financial institute system to execute transfer of an amount of money set for a user bank account in response to the credit use message (S1105). In addition, the credit card system 45 transmits to the management server 10 a transfer execution notification message which is a message notifying that the transfer demanded by the credit demand message has been executed (S1106).

The financial institute system 40 having received the transfer demand message described previously (see S1105) performs transfer processing of the set amount of money (for example, 50,000 Yen) to a user bank account (S1107). Afterwards, the financial institute system 40 transmits to the management server 10 a transfer completion notification message which is a message notifying that the abovementioned transfer processing has been executed (S1008).

The management server 10 having received the abovementioned transfer completion notification message executes processing (transfer request processing) of generating a transfer request message which is a message requesting the financial institute system 40 to transfer an amount of electronic money supply from the user bank account to an electronic money handling account (account for transferring the cash when electronic money has been charged by cash) (S1109). The management server 10 transmits the generated transfer request message to the financial institute system 40 (S1110).

The financial institute system 40 having received this transfer request message executes transfer processing which is processing of transferring the amount of electronic money supply from the user bank account to a transfer destination account of the user (S1111). In a case where the transfer has normally completed, the financial institute system 40 transmits a transfer completion notification message to the management server 10 (S1112).

Afterwards, processing operations which are identical to those of step S1005 to step S1013 described previously are executed. The contents of these processing operations are identical to those of step S1005 to step S1013. A description and an illustration of these processing operations are omitted.

[5. Others]

This settlement system 1 may be further modified so as to have the following characteristics.

[5.1. Handing of Points]

This settlement system 1 may further have a function of awarding and managing points to be provided to a user every time settlement is performed. The "point" is any benefit to be awarded apart from a consideration. As an example, the present settlement system 1 functions so as to one point is provided to the user, in a case where a supply has been performed from a user bank account to a user's premises deposit. An entity awarding points may be a managing operator or a managing administrator of this settlement system 1, may be a managing operator or a managing administrator of the management server 10, may be a managing operator or a managing administrator of the financial institute system 40, a managing operator or a managing administrator of the electronic money settlement system 49 or a managing operator or a managing administrator of the credit system 45 or the like.

Processing of awarding points at the time of ordinary settlement (settlement in a case where the balance of premises deposit is sufficient) may be performed by means of any one of the premises server 31, the management server 10, the electronic money settlement system 49, and a server awarding and/or managing points or under cooperation of two or more of these devices.

In addition, processing of awarding points for settlement at the time of transfer (settlement in a case where the balance of premise deposit is sufficient or settlement at the time of insufficient electronic money balance) may be performed by any one of the premises server 31, the management server 10, the financial institute system 40, the credit card system 45, the electronic money settlement system 49, and any other server, or alternatively, under cooperation of two or more of these devices.

The settlement system 1 may handle points provided by financial institutes, credit card managing companies, electronic money managing companies or the like apart from a point system specific to a store 90 (game facility).

[5.2. Free Gift Exchange System]

This settlement system 1 can easily introduce a system for free gift exchange. This system for free gift exchange is a system for exchanging a user-owned negotiable-value with a free gift or service provided by a shop. At this time, the points described previously may be used as a consideration for exchange with a free gift or service.

[5.3. Settlement About Publicly Managed Competition or the Like]

This settlement system 1 can be used as a settlement system for a variety of publicly managed competitions (a horserace, a bicycle race, a boat race, an auto race or the like) or purchase of vote ticket or purchase of lottery.

[6. Summary]

The above embodiments and modification examples thereof are preferable specific example of the present invention. Therefore, while a variety of technically preferred limitations are provided, as a matter of course these embodiments can be appropriately combined with each other and changed without departing from the spirit of the present invention.

What is claimed is:

1. A settlement system, comprising:
a handheld-type mobile user terminal device including an input portion and an output portion and a non-contact IC card, as well as an application configured to cause the user handheld-type mobile user terminal device to communicate with a wagering-type gaming machine and, upon authentication, serve as a negotiable-value providing device;
the wagering-type gaming machine including: a value-addition mechanism configured to receive game media and including a non-contact IC card reader and validator capable of authenticating a currency bill and at least one of a coin, a token, or an electronically readable ticket or the non-contact IC card, and an award payout mechanism by which game media, currency, other game media, or another award may be dispensed from the wagering-type gaming machine; and
a server, wherein
the handheld-type mobile user terminal device is configured to directly electronically communicate with the wagering-type gaming machine via the application, the non-contact IC card, and non-contact IC card reader, and the server, and wherein, after initial registration of a user into the settlement system:
the handheld-type mobile user terminal device transmits a first data communication signal to the wagering-type gaming machine via the non-contact IC card and the non-contact IC card reader, the first data communication signal comprising a provision demand message including user identification information specifying at least one of a user and the handheld-type mobile user terminal device, and information demanding provision of a negotiable-value;
the wagering-type gaming machine transmits a second data communication signal to the server demanding permission to provide the negotiable-value upon receipt of the first data communication signal; and
the server stores user deposit information after being associated with the user identification information, and transmits a third data communication signal to the wagering-type gaming machine notifying that an amount of a user deposit is insufficient when the amount of the user deposit is less than the negotiable-value when the second data communication signal is received from the wagering-type gaming machine, the wagering-type gaming machine transmits an eighth data communication signal to the handheld-type mobile user terminal device, the eighth data communication signal comprising a deposit supply demand message including information demanding supply of a deposit upon receipt of the third data communication signal, the server transmitting a fifth data communication signal comprising a transfer request message including information requesting transfer of a predetermined amount from an account of the user upon receipt of a fourth data communication signal from the handheld-type mobile user terminal, the fourth data communication signal comprising a transfer demand message including information demanding transfer of the predetermined amount or more and being transmitted from the handheld-type mobile user terminal to the server, and wherein
the handheld-type mobile user terminal device prompts input of a user confirmation to execute a transfer of a deposit supply upon receipt of the eight data communication signal from the wagering-type gaming machine, and then upon input of the input user confirmation, transmits the fourth data communication signal to the server to request the transfer of the deposit supply,
the server transmits a ninth data communication signal to the wagering-type gaming machine, the ninth data communication signal comprising a provision instructing message including information instructing provision of the negotiable-value upon receipt of a sixth data communication signal, the sixth data communication signal comprising a transfer completion message including information indicating transfer of the predetermined amount or more, and
the wagering-type gaming machine receives the ninth data communication signal and executes provision of the negotiable-value.

2. A settlement system, comprising:
a handheld-type mobile user terminal device including an input portion, an output portion, and a non-contact IC card, the handheld-type mobile user terminal device including an application to cause the handheld-type mobile user terminal device to communicate with a wagering-type gaming machine and, upon authentication, to serve as a negotiable-value providing device;
the wagering-type gaming machine including:
  a value-addition mechanism including a slot configured to receive game media,
  a non-contact IC card reader,
  a validator capable of authenticating a currency bill and at least one of a coin, a token, or an electronically readable ticket or the non-contact IC card, and,
  an award payout mechanism by which game media, currency, other game media, or another award may be dispensed from the wagering-type gaming machine;
a first server, and
a second server, wherein
the handheld-type mobile user terminal device is in direct electronic communication with the wagering-type gaming machine via the non-contact IC card and non-contact IC card reader, and is in direct electronic communication with the second server, and wherein, after initial registration of a user into the settlement system:
the handheld-type mobile user terminal device transmits a first data communication signal to the wagering-type gaming machine, the first data communication signal comprising a provision demand message including user identification information specifying at least one of the user and the handheld-type mobile user terminal device, and information demanding provision of a negotiable-value;
the wagering-type gaming machine transmits a second data communication signal to the first server demanding permission to provide the negotiable-value upon receipt of the first data communication signal;
the first server stores user deposit information after being associated with the user identification information, and transmits a third data communication signal to the wagering-type gaming machine notifying that an amount of a user deposit is insufficient when the amount of the user deposit less than the negotiable-value when the second data communication signal is received from the wagering-type gaming machine;
the wagering-type gaming machine transmits an eighth data communication signal to the handheld-type mobile user terminal device comprising a deposit supply demand message including information demanding supply to the user deposit upon receipt of the third data communication signal,
the handheld-type mobile user terminal device prompts input of a user confirmation to execute a transfer of a deposit supply upon receipt of the eight data communication signal from the wagering-type gaming machine, and then upon input of the user confirmation, transmits the fourth data communication signal to the second server to request the transfer of the deposit supply, and,
the second server transmits a fifth data communication signal to a financial institution comprising a transfer request message including information requesting transfer of a predetermined amount from an account of the user upon receipt of a fourth data communication signal from the handheld-type mobile user terminal, the fourth data communication signal comprising a transfer demand message including information demanding transfer of the predetermined amount or more from the account of the user, and the second server transmits a seventh data communication signal to the first server, the seventh data communication signal comprising a payment check message including information indicating that the predetermined amount or more has been transferred from the account of the user to the second server upon receipt of a sixth data communication signal from the financial institution indicating that the predetermined amount or more has been transferred, wherein
the first server transmits a ninth data communication signal to the wagering-type gaming machine, the ninth data communication signal comprising a provision instructing message including information instructing provision of the negotiable-value upon receipt of the seventh data communication signal indicating transfer of the predetermined amount or more, and
the wagering-type gaming machine receives the ninth data communication signal and executes provision of the negotiable-value.

3. The settlement system according to claim 2, wherein
the handheld-type mobile user terminal device is in direct communication with the second server and,
the handheld-type mobile user terminal device, upon receipt of the eighth data communication signal, provides a standby display for input of the user confirmation.

4. The settlement system according to claim 2, wherein
the handheld-type mobile user terminal device transmits the fourth data communication signal to the second server when the handheld-type mobile user terminal device and the wagering-type gaming machine are connected to communicate with each other after receipt of the eighth data communication signal.

5. The settlement system according to claim 2, wherein:
the second server transmits an eleventh data communication signal to the handheld-type mobile user terminal device, the eleventh data communication signal comprising a payment instruction demand message including information demanding a payment to a user account utilizing a second financial institution, upon receipt of a tenth data communication signal comprising a payment instruction demand message including information indicating that a balance of the user account is insufficient after the second server has transmitted the fifth data communication signal;
the handheld-type mobile user terminal device transmits a twelfth data communication signal to the second server, the twelfth message comprising a credit use message including information for instructing a payment to the user account by utilizing the second financial institution after receiving the eleventh data communication signal;
the second server transmits a thirteenth data communication signal comprising a credit demand message including information demanding transfer of the predetermined amount or more to the user account by utilizing the second financial institution upon receipt of the twelfth data communication signal for a credit use message, and transmits a fifteenth data communication signal to the first server, the fifteenth data communication message comprising a payment check message including information confirming payment to the user deposit upon receipt of a fourteenth data communication signal including information indicating that the predetermined amount or more has been transferred to the user account by utilizing the second financial institution;

the first server transmits a sixteenth data communication signal to the wagering-type gaming machine, the sixteenth data communication signal comprising a provision instruction message including information instructing provision of the negotiable-value upon receipt of the fifteenth data communication signal for the payment check message; and the wagering-type gaming machine executes provision of the negotiable-value upon receipt of the sixteenth data communication signal.

6. The settlement system according to claim 2, wherein:

the handheld-type mobile user terminal device further has an electronic money processing module for making a payment of money of a negotiable-value electronically stored, the negotiable-value being associated with at least one of the user and the handheld-type mobile user terminal device; and the second server transmits a seventeenth data communication signal comprising a transfer request message including information demanding supply of a balance of electronic money by transfer from the user account when the balance of the electronic money of a user deposit is insufficient for a payment of money for providing a negotiable-value, and transmits an eighteenth data communication signal comprising a credit utilizing message including information demanding transfer of the predetermined amount or more to the user account by utilizing the second financial institution when the balance in the user account is insufficient, and transmits a twenty first data communication signal comprising a charge instructing message including information instructing supply of a balance of electronic money to the handheld-type user terminal device upon receipt of a nineteenth data communication signal comprising a transfer completion message including information indicating a transfer from the user account or a twentieth data communication signal comprising a transfer completion notification message including information indicating transfer of the predetermined amount or more to the user account by utilizing the second financial institution.

7. A gaming machine settlement system comprising:

a wagering-type gaming machine including:
  a value-addition mechanism configured to receive game media, an award payout mechanism by which game media, currency, other game media, or another award may be dispensed from the wagering-type gaming machine, and a non-contact IC card reader, the value-addition mechanism including a validator capable of authenticating a currency bill and at least one of a coin, a token, or an electronically readable ticket or a non-contact IC card;

a user electronic storage device including an IC card configured for non-contact communication with the non-contact IC card reader of the wagering-type gaming machine, the user electronic storage device including an application to cause the user electronic storage device to communicate with the wagering-type gaming machine and, upon authentication, to serve as a negotiable-value providing device, the user electronic storage device storing an amount of deposit from a user after being associated with user identification information, and providing a negotiable-value corresponding to the stored amount of the deposit in response to information displayed on the display of the wagering-type gaming machine and an input data communication signal demanding provision of the negotiable-value from a user in order to enable play of a game of the wagering-type gaming machine, wherein, after initial registration of a user into the settlement system:

the user electronic storage device communicates with an external financial institute system in which a user account is registered, and draws an amount of deposit deposited in the user account of the external financial institute system in response to information displayed on the display of the wagering-type gaming machine and the user's demand, the user electronic storage device including the processing operations of:

determining whether the amount of the stored deposit is sufficient for an amount corresponding to a negotiable-value demanded by the user, when an input data communication signal demanding provision of a negotiable-value is received from the user;

where it is determined that the amount of the stored deposit is not sufficient for the amount corresponding to the negotiable-value demanded by the user, transmitting information requesting transfer of a predetermined amount for supplying the deposit, to the external financial institute system in which the user account is registered;

in response to an input of a user confirmation prompt displayed in the display to execute a transfer of a deposit supply, supplying the predetermined amount to the stored deposit; and when a transfer completion data communication signal of the predetermined amount has been received from the external financial institute system, executing provision of the negotiable-value demanded from the user in order to enable continuation of the user's play of the game, based on the supplied deposit.

8. The settlement system according to claim 1, wherein the handheld-type mobile user terminal device upon receipt of the eighth data communication signal, provides a standby display for input of the user confirmation.

9. The settlement system according to claim 1, wherein the handheld-type mobile user terminal transmits the fourth data communication signal to the server after receipt of the eighth data communication signal for the deposit supply demand message.

10. A settlement system comprising:

a wagering-type gaming machine;

a handheld mobile user terminal device including an application to cause the user handheld mobile user terminal device to communicate with the wagering-type gaming machine and, upon authentication, to serve as a negotiable-value providing device; and, a server, wherein:
  each of the handheld mobile user terminal device, the wagering-type gaming machine, and the server are configured for communication with one another,
  the wagering-type gaming machine includes a value-addition device configured to receive a negotiable-value, the value-addition device including a validator capable of authenticating a currency bill and at least one of a coin, a token, or an electronically readable ticket or card, the handheld mobile user terminal device is configured to store user identification information, identification information corresponding to a server, and user bank information, and transmit the user identification information, the identification information corresponding to the server, and the user bank information to the server upon a demand to transfer a deposit, the server stores, in advance, the user identification information and user deposit information associated with the user identification information, the server including a data table that stores a server ID for specifying a server included in the settlement system and a game facility business operator ID, the wagering-type gaming machine is configured to provide, in order to enable play of a game thereon, via the server, a negotiable-value corresponding to the user deposit information stored in the server, in response to an input signal demanding provision of the negotiable-value from the handheld mobile user terminal device, the wagering-type gaming machine requests the handheld mobile user terminal device to provide a deposit supply to the server when an amount of the deposit in the user deposit information stored on the server is smaller than the negotiable-value provided, the handheld mobile user terminal device prompts an input of a user verification, and upon receipt thereof, transmits a signal to the server to execute the transfer of the deposit supply, the server provides the deposit supply for the user deposit information in response to the input signal for executing the transfer of the deposit supply from the handheld mobile user terminal device and then performs a processing operation to update the user deposit information, and the wagering-type gaming machine provides the negotiable-value via the server, based on the user deposit information that has been updated by the server.

\* \* \* \* \*